US012671075B2

(12) United States Patent
Tamura et al.

(10) Patent No.: US 12,671,075 B2
(45) Date of Patent: Jun. 30, 2026

(54) BATTERY INCLUDING AN AIR GAP THAT IS BETWEEN A COLLECTOR AND SOLID ELECTROLYTE LAYER AND IN CONTACT WITH AN INSULATING LAYER

(71) Applicant: Panasonic Intellectual Property Management Co., Ltd., Osaka (JP)

(72) Inventors: Takaaki Tamura, Osaka (JP); Kazuhiro Morioka, Osaka (JP); Akira Kawase, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 682 days.

(21) Appl. No.: 17/960,132

(22) Filed: Oct. 5, 2022

(65) Prior Publication Data

US 2023/0024599 A1 Jan. 26, 2023

Related U.S. Application Data

(63) Continuation of application No. PCT/JP2021/008439, filed on Mar. 4, 2021.

(30) Foreign Application Priority Data

Apr. 17, 2020 (JP) ................................. 2020-074155

(51) Int. Cl.
| | |
|---|---|
| *H01M 4/13* | (2010.01) |
| *H01M 4/62* | (2006.01) |
| *H01M 10/0525* | (2010.01) |
| *H01M 10/0585* | (2010.01) |
| *H01M 4/02* | (2006.01) |

(52) U.S. Cl.
CPC .............. H01M 4/13 (2013.01); H01M 4/62 (2013.01); H01M 10/0525 (2013.01);
(Continued)

(58) Field of Classification Search
CPC ...... H01M 4/13; H01M 4/62; H01M 10/0525; H01M 10/0585; H01M 2004/028; H01M 2300/0065; H01M 4/366
See application file for complete search history.

(56) References Cited

U.S. PATENT DOCUMENTS

| | | | |
|---|---|---|---|
| 2014/0079992 A1 | 3/2014 | Tanaka | |
| 2016/0315346 A1* | 10/2016 | Sasaki | ................. H01M 10/052 |

(Continued)

FOREIGN PATENT DOCUMENTS

| | | |
|---|---|---|
| JP | 2015-76178 A | 4/2015 |
| JP | 2016-207286 | 12/2016 |

(Continued)

OTHER PUBLICATIONS

Machine Translation Relied Upon for JP 2019083188 A (Year: 2019).*

(Continued)

*Primary Examiner* — Marla D Mcconnell
*Assistant Examiner* — Olivia A Jones
(74) *Attorney, Agent, or Firm* — Greenblum & Bernstein, P.L.C.

(57) ABSTRACT

A battery includes an electrode layer, a counter-electrode layer placed opposite to the electrode layer, and a solid electrolyte layer located between the electrode layer and the counter-electrode layer. The electrode layer includes a collector, an electrode active material layer located between the collector and the solid electrolyte layer, and an insulating layer located between the collector and the solid electrolyte layer and bonded to the collector at ends of the electrode layer. The electrode active material layer has a region that does not overlap the insulating layer in plan view. The (Continued)

battery has an air gap, the air gap being located between the collector and the solid electrolyte layer and being contact with the insulating layer.

12 Claims, 19 Drawing Sheets

(52) U.S. Cl.
CPC .. *H01M 10/0585* (2013.01); *H01M 2004/028* (2013.01); *H01M 2300/0065* (2013.01)

(56) References Cited

U.S. PATENT DOCUMENTS

| | | | | |
|---|---|---|---|---|
| 2017/0263981 A1* | 9/2017 | Satou | .................... | H01M 4/663 |
| 2021/0104775 A1* | 4/2021 | Ono | .................... | H01M 50/586 |
| 2021/0367265 A1 | 11/2021 | Sugiyo | | |

FOREIGN PATENT DOCUMENTS

| | | | | |
|---|---|---|---|---|
| JP | 2018-120709 | 8/2018 | | |
| JP | 2019083188 A * | 5/2019 | ........ | H01M 10/0413 |
| WO | 2007/114311 | 10/2007 | | |
| WO | 2012/164642 | 12/2012 | | |

OTHER PUBLICATIONS

Merriam Webster Definition of "Frame" (Accessed May 13, 2025).*
Merriam Webster Definition of "Between" (Accessed May 13, 2025).*
International Search Report of PCT application No. PCT/JP2021/008439 dated Apr. 20, 2021.
Office Action and Search Report that issued on Feb. 2, 2026, in corresponding Chinese patent application No. 202180027600.5 with partial English translation thereof.

* cited by examiner

BATTERY INCLUDING AN AIR GAP THAT IS BETWEEN A COLLECTOR AND SOLID ELECTROLYTE LAYER AND IN CONTACT WITH AN INSULATING LAYER

BACKGROUND

1. Technical Field

The present disclosure relates to a battery.

2. Description of the Related Art

International Publication No. 2012/164642 and Japanese Unexamined Patent Application Publication No. 2016-207286 disclose a battery including an insulating member.

SUMMARY

The conventional technology is required to improve the reliability of a battery. One non-limiting and exemplary embodiment provides a highly-reliable battery.

In one general aspect, the techniques disclosed here feature a battery including an electrode layer, a counter-electrode layer placed opposite to the electrode layer, and a solid electrolyte layer located between the electrode layer and the counter-electrode layer. The electrode layer includes a collector, an electrode active material layer located between the collector and the solid electrolyte layer, and an insulating layer located between the collector and the solid electrolyte layer and bonded to the collector at ends of the electrode layer. The electrode active material layer has a region that does not overlap the insulating layer in plan view. The battery has an air gap, the air gap being located between the collector and the solid electrolyte layer and being contact with the insulating layer.

The present disclosure makes it possible to provide a highly-reliable battery.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 12A is a schematic cross-sectional view showing an example of a laminated polar plate according to Embodiment 1;

FIG. 12B is a schematic cross-sectional view showing another example of a laminated polar plate according to Embodiment 1;

FIG. 12C is a schematic cross-sectional view showing another example of a laminated polar plate according to Embodiment 1;

FIG. 13 is a diagram for explaining a cutting step of the method for manufacturing a battery according to Embodiment 1.

DETAILED DESCRIPTIONS

Figure 1:
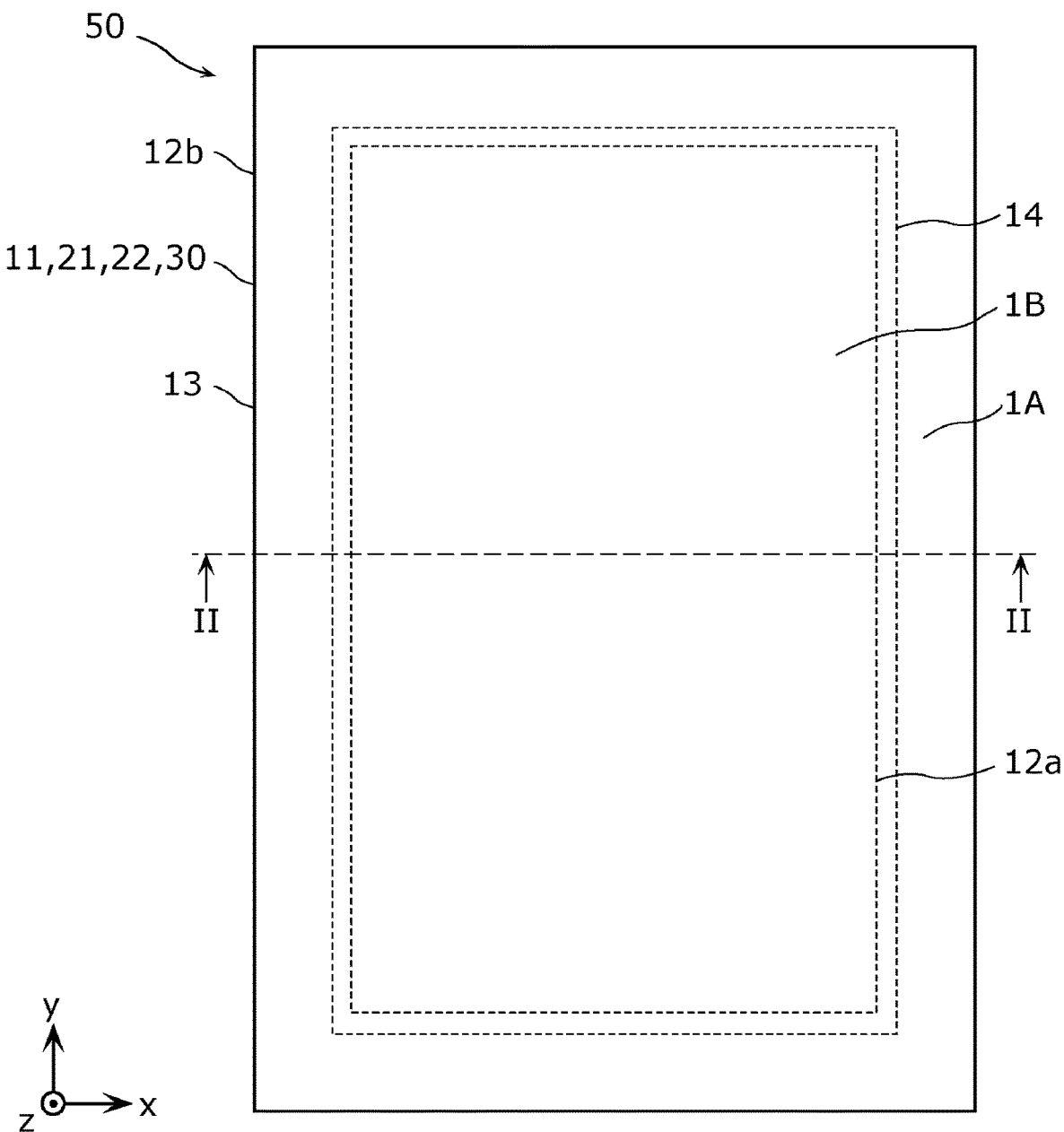
FIG. 1 is a schematic top view showing an example of a battery according to Embodiment 1.

Underlying Knowledge Forming Basis of the Present Disclosure

In a case where a battery such as an all-solid battery including a solid electrolyte layer containing a solid electrolyte is manufactured, it is common to make the area of a negative-electrode active material layer larger than the area of a positive-electrode active material layer. This is intended to stabilize the performance of the battery and improve the reliability of the battery by making the capacitance of the negative-electrode active material layer larger than the capacitance of the positive-electrode active material layer to suppress, for example, deposition of metal derived from metal ions not incorporated into the negative-electrode active material layer. Further, this is also intended to improve the reliability of the battery by suppressing the concentration of electric fields at ends of the negative-electrode active material layer to inhibit dendrite growth (deposition of metal) at the ends. Further, in a case where the area of the negative-electrode active material layer is made larger, the solid electrolyte layer, for example, is disposed around the positive-electrode active material layer, which is placed opposite to the negative-electrode active material layer. This causes the positive-electrode active material layer, which expands and contracts during charge and discharge, to be surrounded by the solid electrolyte layer, thus enhancing the reliability also by inhibiting the positive-electrode active material layer from delaminating from another layer.

However, it is difficult to manufacture a battery while precisely controlling the area of a positive-electrode active material layer and the area of a negative-electrode active material layer as just described. Further, for the purpose ensuring reliability, it is necessary to form the positive-electrode active material layer in consideration of the dimensional accuracy with which the positive-electrode active material layer is formed. This undesirably causes the positive-electrode active material layer to be small and causes the volume energy density of the battery to be low. Further, increasing the dimensional accuracy of the positive-electrode active material layer raises concern about an increase in the number of steps such as inspections and an increase in facility cost.

To address this problem, the present disclosure provides a highly-reliable battery. In particular, the present disclosure provides a highly-reliable battery with an increased volume energy density.

The following gives a brief description of an aspect of the present disclosure.

A battery according to an aspect of the present disclosure includes an electrode layer, a counter-electrode layer placed opposite to the electrode layer, and a solid electrolyte layer located between the electrode layer and the counter-electrode layer. The electrode layer includes a collector, an electrode active material layer located between the collector and the solid electrolyte layer, and an insulating layer located between the collector and the solid electrolyte layer and bonded to the collector at ends of the electrode layer. The electrode active material layer has a region that does not overlap the insulating layer in plan view. The battery has an air gap, the air gap being located between the collector and the solid electrolyte layer and being contact with the insulating layer.

As a result, although the electrode active material layer of the battery expands and contracts during charge and discharge, the stress attributed to the expansion and contraction of the electrode active material layer can be relaxed by the air gap, as a positive-electrode active material layer and the air gap are located between the collector and the solid electrolyte layer. This reduces the likelihood of interlayer delamination between the electrode active material layer and anther constituent element. This makes it possible to enhance the reliability of the battery.

Further, the presence of the insulating layer bonded to the collector causes a region of a different property to be formed on top of the collector. This makes it possible to utilize the difference in property to easily manufacture a battery having an air gap formed in contact with an insulating layer.

Further, for example, a side surface of the insulating layer and a side surface of the collector may be flush with each other.

This makes it possible to manufacture the battery with the area of the insulating layer easily adjusted, for example, by cutting a laminated combination of the collector and the insulating layer, as the side surface of the insulating layer and the side surface of the collector are flush with each other. Therefore, although the presence of the insulating layer and the air gap, which makes contact with the insulating layer, results in the formation of a region where the electrode active material layer hardly functions as an electrode, the region can be minimized by adjusting the area of the insulating layer. This makes it possible to increase the volume energy density of the battery.

Further, for example, the electrode layer may be a positive-electrode layer, and the counter-electrode layer may be a negative-electrode layer.

Thus, the insulating layer and the air gap, which makes contact with the insulating layer, reduce the area of the electrode active material layer of the positive-electrode layer, which electrons from the collector easily reach, i.e. the positive-electrode active material layer. As a result, the substantive area of the positive-electrode active material layer is smaller than the area of the counter-electrode active material layer of the negative-electrode layer, i.e. the negative-electrode active material layer. Therefore, the capacitance of the negative-electrode active material layer is larger than the capacitance of the positive-electrode active material layer. This suppresses deposition of metal derived from metal ions not incorporated into the negative-electrode active material layer, making it possible to further enhance the reliability of the battery.

Further, even in the absence of the air gap, electrons from the collector do not directly reach a region of the electrode active material layer that overlaps the insulating layer in plan view, i.e. the positive-electrode active material layer. Such a region of the positive-electrode active material layer hardly functions as an electrode. This brings about an effect of substantially reducing the area of the positive-electrode active material layer, but having the air gap in contact with the insulating layer makes it possible to further inhibit electrons from sneaking into the space between the insulating layer and the solid electrolyte layer. This reduces the effect of sneaking of electrons, making it possible to adjust the ratio more accurately in capacity between the negative-electrode active material layer and the positive-electrode active material layer.

Further, for example, the air gap may further be in contact with the solid electrolyte layer.

This causes the air gap to be formed astride the insulating layer and the solid electrolyte layer, as the air gap is in contact with the insulating layer and the solid electrolyte layer. Therefore, the air gap makes it easy to relax the stress applied from the solid electrolyte layer.

Further, the formation of the air gap astride the insulating layer and the solid electrolyte layer makes it possible to prevent migration of electrons from the collector into the space between the insulating layer and the solid electrolyte layer and into the air gap and a region outside the air gap in plan view. This reduces the area of the electrode active material layer that functions as an electrode, making it possible to more accurately adjust the ratio in capacity between the negative-electrode active material layer and the positive-electrode active material layer.

Further, for example, the air gap may overlap an inner end of a bonded surface between the insulating layer and the collector in plan view.

In this way, in a case where the air gap is formed astride the insulating layer and the solid electrolyte layer, the air gap is formed in such a place as to be able to prevent migration of electrons from the collector into the space between the insulating layer and the solid electrolyte layer and into a region outside the inner end of the bonded surface between the insulating layer and the collector. This makes it possible to reduce, according to the area of the insulating layer, the area of the electrode active material layer that functions as an electrode.

Further, for example, the air gap may be located between the insulating layer and the solid electrolyte layer and between the insulating layer and the electrode active material layer, and the electrode active material layer and the insulating layer may not be in contact with each other.

This enlarges the air gap in the battery, making it possible to further relax the stress of expansion and contraction of the electrode active material layer during charge and discharge.

Further, for example, the insulating layer may contain resin.

This makes it possible to enhance the bondability between the insulating layer and collector through an anchoring effect by which the resin contained in the insulating layer penetrates into the collector, making it possible to inhibit the insulating layer from delaminating from the collector.

Further, for example, the insulating layer may contain an inorganic filler.

This makes the insulating layer hard. Therefore, the insulating layer hardly deforms in being laminated on another layer at the time of manufacture of the battery. The insulating layer thus formed can be of uniform thickness.

Further, for example, the insulating layer may be higher in coefficient of linear expansion than the electrode active material layer.

This causes the electrode active material layer to be divided at a position of contact with the insulating layer simply by being heated while being laminated on top of the insulating layer and causes the air gap to be formed, as the electrode active material layer is less likely to expand than the insulating layer. This makes it possible to easily manufacture a battery having an air gap formed in contact with an insulating layer.

Further, for example, the insulating layer may be located in a region where a length of the collector from an outer periphery in plan view is less than or equal to 1 mm.

In this way, a region where the presence of the insulating layer and the air gap, which is in contact with the insulating layer, makes it hard for the electrode active material layer to function as an electrode can fall within a range of distances less than or equal to a certain distance from the outer periphery of the collector. This makes it possible to increase the volume energy density of the battery.

Further, for example, a thickness of the insulating layer may be greater than or equal to 50% and less than or equal to 100% of a thickness of the electrode active material layer.

This narrows the space between the solid electrolyte layer and the insulating layer, thus making it possible to easily form the air gap between the solid electrolyte layer and the insulating layer. Further, this reduces the amount of a slurry with which the insulating layer is coated, for example, in forming the electrode active material layer by using a wet coating method. In a case where the air gap is formed by repelling the slurry by the surface tension of the insulating layer, the air gap is easily formed.

Further, for example, a side surface of the electrode layer, a side surface of the counter-electrode layer, and a side surface of the solid electrolyte layer may be flush with one another.

This makes it possible to manufacture the battery with the area of the insulating layer easily adjusted, as the side surfaces of the layers can be made flush with one another, for example, by collectively cutting the layers.

Further, for example, a side surface of the battery may be a cut surface.

In this way, since the side surface, which is to become an end of the battery, is formed by cutting, adjusting the area of the insulating layer according to cutting position makes it possible to reduce the area of a region where the presence of the insulating layer and the air gap, which makes contact with the insulating layer, makes it hard for the electrode active material layer to function as an electrode, making it possible to increase the volume energy density of the battery.

Further, since the side surface of the battery is a cut surface, the side surface of the electrode layer, the side surface of the counter-electrode layer, and the side surface of the solid electrolyte layer can be easily made flush with one another.

Further, for example, the insulating layer may be in a shape of a frame provided on an outer periphery of the electrode layer in plan view.

This makes it possible to provide the air gap, which is in contact with the insulating layer, in any place on the outer periphery of the electrode layer.

Further, for example, the solid electrolyte layer may contain a solid electrolyte having lithium-ion conductivity.

This makes it possible to enhance the battery reliability of a lithium-ion battery containing a solid electrolyte.

The following describes embodiments in concrete terms with reference to the drawings.

It should be noted that the embodiments to be described below each illustrate a comprehensive and specific example. The numerical values, shapes, materials, constituent elements, placement and topology of constituent elements, or other features that are shown in the following embodiments are just a few examples and are not intended to limit the present disclosure.

Further, terms such as "parallel" and "flush" used herein to show the way in which elements are interrelated, terms such as "flat" and "rectangular" used herein to show the shape of an element, and ranges of numerical values used herein are not expressions that represent only exact meanings but expressions that are meant to also encompass substantially equivalent ranges, e.g. differences of approximately several percent.

Further, the drawings are not necessarily strict illustrations. In the drawings, substantially the same components are given the same reference signs, and a repeated description may be omitted or simplified.

Further, in the present specification and drawings, the x axis, the y axis, and the z axis represent the three axes of a three-dimensional orthogonal coordinate system. In each of the embodiments, the z-axis direction is a direction of laminating of a battery. Further, a positive direction parallel with the z axis is upward in the z-axis direction, and a negative direction parallel with the z axis is downward in the z-axis direction. Further, the term "plan view" used herein means a case where the battery is seen from an angle parallel with the z axis. Further, the term "thickness" used herein means the length of each layer in the direction of laminating.

Further, the terms "above" and "below" in the configuration of a battery used herein do not refer to an upward direction (upward in a vertical direction) and a downward direction (downward in a vertical direction) in absolute space recognition, but are used as terms that are defined by a relative positional relationship on the basis of an order of laminating in a laminating configuration. Further, the terms "above" and "below" are applied not only in a case where two constituent elements are placed at a spacing from each other with another constituent element present between the two constituent elements, but also in a case where two constituent elements touch each other by being placed in close contact with each other.

Further, the terms "inner" and "outer" in terms such as "inner side" and "outer side" herein refer to the inside and outside of a battery as seen from an angle parallel with the direction of laminating. That is, the inner side is close to the center of each layer, and the outer side is close to the outer periphery of each layer.

Embodiment 1

The following describes a battery according to Embodiment 1. The battery according to Embodiment 1 is a single cell including one electrode active material layer and one counter-electrode active material layer.

Configuration

Figure 2:
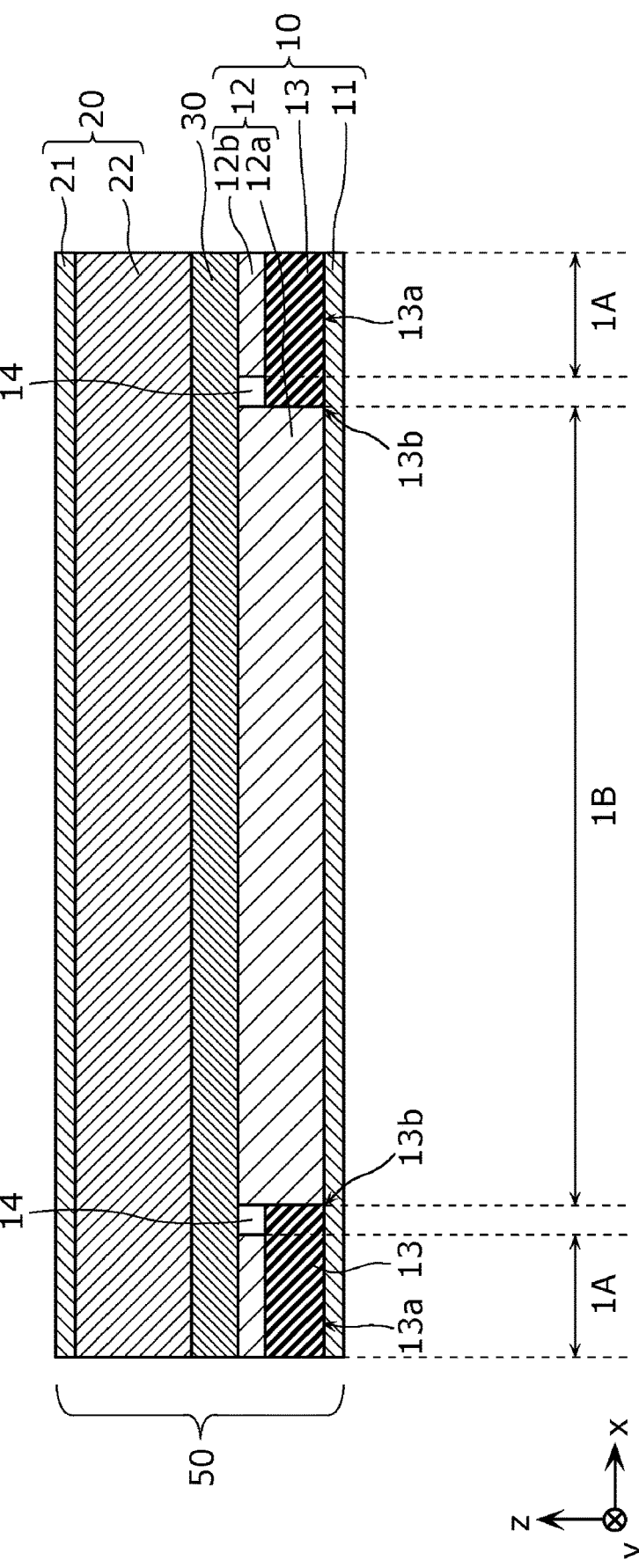
FIG. 2 is a diagram showing an example of a cross-section taken along line II-II in FIG. 1.

First, a configuration of the battery according to Embodiment 1 is described with reference to the drawings. FIG. 1 is a schematic top view showing an example of a battery according to the present embodiment. FIG. 2 is a diagram showing an example of a cross-section taken along line II-II in FIG. 1.

As shown in FIGS. 1 and 2, the battery 50 according to the present embodiment includes an electrode layer 10, a counter-electrode layer 20 placed opposite to the electrode layer 10, and a solid electrolyte layer 30 located between the electrode layer 10 and the counter-electrode layer 20. That is, the battery 50 has a structure in which the electrode layer 10, the solid electrolyte layer 30, and the counter-electrode layer 20 are laminated in this order.

The electrode layer 10 includes a collector 11, an electrode active material layer 12 located between the collector 11 and the solid electrolyte layer 30, and an insulating layer 13 located between the collector 11 and the solid electrolyte layer 30 and bonded to the collector 11 at ends of the electrode layer 10 in plan view. The electrode active material layer 12 is constituted by electrode active material layers 12a and 12b separated from each other by the after-mentioned air gap 14. Although, in the illustrated example, the insulating layer 13 is in contact with the collector 11. the insulating layer 13 may be bonded to the collector 11 via an adhesive layer or other layers.

The counter-electrode layer 20 includes a collector 21 and a counter-electrode active material layer 22 located between the collector 21 and the solid electrolyte layer 30.

Further, the battery 50 has an air gap 14, located between the collector 11 and the solid electrolyte layer 30, that is in contact with the insulating layer 13. That is, the battery 50 is provided with an air gap 14, located between the collector 11 and the solid electrolyte layer 30, through which the insulating layer 13 is exposed.

The battery 50 is for example an all-solid battery. A side surface of the battery 50 is parallel with the direction of laminating. Further, the side surface of the battery 50 is a flat surface. In other words, a side surface of the electrode layer 10, a side surface of the counter-electrode layer 20, and a side surface of the solid electrolyte layer 30 are in a stepless state, and are located at the same flat surface. That is, the side surface of the electrode layer 10, the side surface of the counter-electrode layer 20, and the side surface of the solid electrolyte layer 30 are flush with one another. It should be noted that the term "side surface" refers to a surface of each constituent element of the battery 50 that extends from an end of a principal surface in a direction intersecting the principal surface, with the principal surface being a flat surface that is perpendicular to the direction of laminating. Further, at an end of the electrode layer 10 in a direction perpendicular to the direction of laminating, a side surface of the insulating layer 13, a side surface of the electrode active material 12b, and a side surface of the collector 11 are flush with one another. Further, at an end of the counter-electrode layer 20 in a direction perpendicular to the direction of laminating, a side surface of the counter-electrode active material layer 22 and a side surface of the collector 21 are flush with each other. That is, at an end of the battery 50 in a direction perpendicular to the direction of laminating, the respective side surfaces of the collector 11, the insulating layer 13, the electrode active material layer 12b, the solid electrolyte layer 30, the counter-electrode active material layer 22, and the collector 21 are flush with one another, and form the same flat surface. This makes it possible to make the side surfaces of the layers flush with one another, for example, by collectively cutting the layers, thus making it possible to manufacture the battery 50 with the areas of the insulating layer 13 and the electrode active material layer 12b easily adjusted.

The side surface of the battery 50 is for example a cut surface. Specifically, the side surface of the battery 50 is a surface formed by being cut with the edge of a cutter or other tools for cutting and, for example, is a surface having traces of cutting such as fine grooves. Since the battery 50 has a cut surface formed by being thus cut, the locations to form the insulating layer 13 and the electrode active material layer 12b can be adjusted. This makes it possible to reduce the area of a portion (specifically a portion in which the electrode active material layer 12b and the air gap 14 are located in plan view, which will be described in detail later) that does not contribute to the charge-discharge performance of the battery 50, making it possible to improve the volume energy density. Further, since the side surface of the battery 50 is a cut surface, the side surface of the electrode layer 10, the side surface of the counter-electrode layer 20, and the side surface of the solid electrolyte layer 30 can be easily made flush with one another. It should be noted that the traces of cutting may be smoothed by polishing. The cut surface is not limited to particular shapes; however, in the case of the battery 50, the cut surface is rectangular.

Further, the shapes of the collector 11, the electrode active material layer 12a, the solid electrolyte layer 30, the counter-electrode active material layer 22, and the collector 21 in plan view are rectangles, but are not limited to particular shapes and may be circles, ellipses, polygons, or other shapes.

The collector 11 is in contact with lower surfaces of the electrode active material layer 12 (specifically the electrode active material layer 12a) and the insulating layer 13, and covers the lower surfaces of the electrode active material layer 12 and the insulating layer 13. At ends of the collector 11 in plan view, the insulating layer 13 is laminated, and the air gap 14 is in contact with the insulating layer 13. The thickness of the collector 11 is for example greater than or equal to 5 μm and smaller than or equal to 100 μm.

As a material of the collector 11, a generally known material may be used. As the collector 11, a foil-like body, a plate-like body, a net-like body, or other bodies composed of, for example, copper, aluminum, nickel, iron, stainless steel, platinum, gold, an alloy of two or more types thereof, or other substances are used.

Upper surfaces of the electrode active material layers 12a and 12b are in contact with the solid electrolyte layer 30. The electrode active material layers 12a and 12b and the counter-electrode active material layer 22 face each other across the solid electrolyte layer 30. A lower surface of the electrode active material layer 12a is in contact with the collector 11. The electrode active material layer 12b is in the shape of a frame in plan view, and surrounds the electrode active material layer 12a. The electrode active material layer 12b is laminated above the collector 11 so as to cover the insulating layer 13, which is on top of the collector 11. The electrode active material layer 12 has a region that does not overlap the insulating layer 13 in plan view. Specifically, in a plan view, the electrode active material layer 12a does not overlap the insulating layer 13, and the electrode active material layer 12b overlaps the insulating layer 13. The thickness of the electrode active material layer 12a is for example greater than or equal to 5 μm and smaller than or equal to 300 μm. A material for use in the electrode active material layer 12 will be described later.

Although the electrode active material layer 12a and the electrode active material layer 12b are not in contact with each other at all and are completely separated from each other, they may alternatively be partially connected to each other.

As mentioned above, the insulating layer 13 is in contact with the air gap 14, and is located between the collector 11 and the solid electrolyte layer 30. An upper surface of the insulating layer 13 is in contact with the electrode active material layer 12b and the air gap 14, and an inner side surface of the insulating layer 13 in plan view is in contact with the electrode active material layer 12a. The insulating layer 13 is in contact with the electrode active material layer 12b at ends of the electrode layer 10 in plan view. Further, the side surface of the insulating layer 13 and the side surface of the collector 11 are flush with each other. Further, the side surface of the insulating layer 13 and a side surface of the electrode active material layer 12 (specifically the electrode active material layer 12b) are flush with each other. The lower surface of the insulating layer 13 is in contact with the collector 11. Further, the insulating layer 13 overlaps the counter-electrode active material layer 22 in plan view.

In the illustrated example, the insulating layer 13 is in the shape of a frame located on the outer periphery of the electrode layer 10 in plan view. That is, the insulating layer 13 is located between the collector 11 and the solid electrolyte layer 30 at all ends of the electrode layer 10 in directions perpendicular to the direction of laminating.

The insulating layer 13 contains, for example, at least one of resin and an inorganic filler. Examples of the resin include silicone resin, epoxy resin, acrylic resin, and polyimide resin. The resin may be thermosetting resin or ultraviolet-curable resin. The inclusion of the resin by the insulating layer 13 makes it possible to enhance the bondability between the insulating layer 13 and the collector 11, for example, through an anchoring effect by which the resin penetrates into the collector 11. Further, adjusting the surface tension of the rein makes it possible to, for example, in forming an electrode active material layer by using a wet coating method, form an insulating layer 13 having such surface tension as to repel a slurry containing an electrode active material, making it easy to form an air gap 14. Examples of the inorganic filler include particles of metal oxides such as silicon oxide, titanium oxide, aluminum oxide, and aluminum nitride. The inclusion of the inorganic filler by the insulating layer 13 makes the insulating layer 13 hard. Therefore, the insulating layer 13 hardly deforms in being laminated on another layer. The insulating layer 13 thus formed can be of uniform thickness. Further, selecting, as a material of the insulating layer 13, a material that is higher in coefficient of linear expansion than the electrode active material layer 12 makes it easy to form the air gap 14 by a heat treatment or other processes. A method for forming the air gap 14 will be described in detail later.

The thickness of the insulating layer 13 is smaller than or equal to the thickness of the electrode active material layer 12a of the electrode active material layer 12. The thickness of the insulating layer 13 is greater than or equal to 50% and less than or equal to 100% of the thickness of the electrode active material layer 12a. Alternatively, the thickness of the insulating layer 13 may be greater than or equal to 50% and less than 100% of the thickness of the electrode active material layer 12a. This reduces the amount of a slurry that is applied onto the insulating layer 13 as the slurry is applied onto the collector 11 and the insulating layer 13, for example, in forming the electrode active material layer 12 by using a wet coating method. In a case where the air gap 14 is formed by repelling the slurry by the surface tension of the insulating layer 13, the air gap 14 is easily formed. Further, in a case where the air gap 14 is formed by the difference in coefficient of linear expansion between the insulating layer 13 and the electrode active material layer 12, the air gap 14 is easily formed, as a portion of the electrode active material layer 12 that is on top of the insulating layer 13 is thin.

The insulating layer 13 is for example completely insulative, however, depending on battery characteristics required, the insulating layer 13 may slightly have electrical conductivity due to a constituent material and thickness of the insulating layer 13.

Further, the insulating layer 13 is located in a region where a length of the collector 11 from the outer periphery, for example, in plan view is less than or equal to 1 mm from the point of view of an effective area that contributes to power generation, i.e. from the point of view of volume energy density. Further, a width of the insulating layer 13 in a case where the insulating layer 13 is formed in the shape of a frame or a line or other shapes is for example smaller than or equal to 1 mm, and may be smaller than or equal to 0.5 mm or may be smaller than or equal to 0.1 mm from the point of view of volume energy density. The width of the insulating layer 13 is changed, for example, depending on battery characteristics required.

The air gap 14 is located between the collector 11 and the solid electrolyte layer 30. Further, the air gap 14 is located between the insulating layer 13 and the solid electrolyte layer 30, and is in contact with the insulating layer 13. Specifically, the air gap 14 is in contact with the upper surface of the insulating layer 13. Further, the air gap 14 is further in contact with the solid electrolyte layer 30. The air gap 14 is located astride the insulating layer 13 and the solid electrolyte layer 30, and causes the insulating layer 13 and the solid electrolyte layer 30 to be exposed. Therefore, the air gap 14 divides the electrode active material layer 12 into the electrode active material layer 12a and the electrode active material layer 12b. That is, the air gap 14 is located between the electrode active material layer 12a and the electrode active material layer 12b. Thus, the presence of the air gap 14 makes it possible to prevent electricity from sneaking into the electrode active material layer 12b. Therefore, the electrode active material layer 12b, which is located on top of the insulating layer 13, does not contribute to the charge and discharge performance, making it possible to more accurately adjust the ratio in capacity between the electrode active material layer 12 and the counter-electrode active material layer 22.

Further, the air gap 14 overlaps an inner end 13b of a bonded surface 13a between the insulating layer 13 and the collector 11 in plan view. This causes the air gap 14 to be formed in such a place as to be able to prevent migration of electrons from the collector 11 into the space between the insulating layer 13 and the solid electrolyte layer 30 and into a region outside the inner end 13b of the bonded surface 13a between the insulating layer 13 and the collector 11. This makes it possible to reduce, according to the area of the insulating layer 13, the area of the electrode active material layer 12 that functions as an electrode.

Further, the air gap 14 is provided along a direction parallel with the length of the insulating layer 13 in plan view. Therefore, the air gap 14 is in the shape of a frame in plan view, and is formed all around the frame-shaped insulating layer 13 along a circumferential direction. Specifically, the air gap 14 is formed in such a place as to overlap the insulating layer 13, which in the shape of a frame in plan view, along the inner periphery of the insulating layer 13. The air gap 14 is not formed inside the insulating layer 13 in plan view. This causes the outside of the region 1B (described in detail later), which is a region where the electrode active material layer 12 does not function as a battery, to be the same as a region where the insulating layer 13 is formed, thus preventing the region that does not function as a battery from becoming larger than the region where the insulating layer 13 is formed and making it possible to increase the volume energy density of the battery 50.

Further, the air gap 14 is located in a region where a length of the collector 11 from the outer periphery, for example, in plan view is less than or equal to 1.5 mm from the point of view of inhibiting a decrease in volume energy density. The air gap 14 may be located in a region where a length of the collector 11 from the outer periphery in plan view is less than or equal to 1 mm or may be located in a region where a length of the collector 11 from the outer periphery in plan view is less than or equal to 0.5 mm.

The collector 21 is in contact with an upper surface of the counter-electrode active material layer 22, and covers the upper surface of the counter-electrode active material layer 22. The thickness of the collector 21 is for example greater than or equal to 5 μm and smaller than or equal to 100 μm. As a material of the collector 21, the material of the aforementioned collector 11 may be used.

The counter-electrode active material layer 22 is laminated on top of the solid electrolyte layer 30, and is placed opposite to the electrode active material layer 12 (specifically the electrode active material layers 12a and 12b). The upper surface of the counter-electrode active material layer 22 is in contact with the collector 21. The thickness of the counter-electrode active material layer 22 is for example greater than or equal to 5 μm and smaller than or equal to 300 μm. A material for use in the counter-electrode active material layer 22 will be described later.

The solid electrolyte layer 30 is located between the electrode active material layer 12 and the counter-electrode active material layer 22. The thickness of the solid electrolyte layer 30 is for example greater than or equal to 5 μm and smaller than or equal to 150 μm.

The solid electrolyte layer 30 contains at least a solid electrolyte and, if necessary, may contain a binder material. The solid electrolyte layer 30 may contain a solid electrolyte having lithium-ion conductivity.

As the solid electrolyte, a generally known metal-ion-conducting material such as a lithium-ion conductor, a sodium ion conductor, or a magnesium ion conductor may be used. As the solid electrolyte, for example, a solid electrolyte material such as a sulfide solid electrolyte, a halogenated solid electrolyte, or an oxide solid electrolyte is used. In the case of a material that is able to conduct lithium ions, for example, a synthetic substance composed of lithium sulfide ($Li_2S$) and diphosphorous pentasulfide ($P_2S_5$) is used as the sulfide solid electrolyte. Further, as the sulfide solid electrolyte, a sulfide such as $Li_2S$—$SiS_2$, $Li_2S$—$B_2S_3$, or $Li_2S$—$GeS_2$ may be used, or a sulfide obtained by adding at least one type of $Li_3N$, LiCl, LiBr, $Li_3PO_4$, or $Li_4SiO_4$ as an additive to the aforementioned sulfide may be used. In the case of a material that is able to conduct lithium ions, for example, $Li_7La_3Zr_2O_{12}$ (LLZ), $Li_{1.3}Al_{0.3}Ti_{1.7}(PO_4)_3$ (LATP), (La,Li)$TiO_3$ (LLTO), or other substances are used as the oxide solid electrolyte.

As the binder material, for example, elastomers are used, or an organic compound such as polyvinylidene fluoride, acrylic resin, or cellulose resin may be used.

In the present embodiment, one of the electrode layer 10, which includes the electrode active material layer 12, and the counter-electrode layer 20, which includes the counter-electrode active material layer 22, is a positive-electrode layer including a positive-electrode active material layer, and the other is a negative-electrode layer including a negative-electrode active material layer.

The positive-electrode active material layer contains at least a positive-electrode active material and, if necessary, may contain at least one of a solid electrolyte, a conductive auxiliary agent, and a binder material.

As the positive-electrode active material, a generally known material that is capable of occlusion and ejection (insertion and desorption or dissolution and deposition) of lithium ions, sodium ions, or magnesium ions may be used. In the case of a material that is capable of desorption and insertion of lithium ions, for example, a lithium cobalt oxide complex oxide (LCO), a lithium nickel oxide complex oxide (LNO), a lithium manganese oxide complex oxide (LMO), a lithium-manganese-nickel complex oxide (LMNO), a lithium-manganese-cobalt complex oxide (LMCO), a lithium-nickel-cobalt complex oxide (LNCO), a lithium-nickel-manganese-cobalt complex oxide (LNMCO), or other substances are used as the positive-electrode active material.

As the solid electrolyte, the aforementioned solid electrolyte material may be used. Further, as the conductive auxiliary agent, for example, a conducting material such as acetylene black, carbon black, graphite, or carbon fiber is used. Further, as the binder material, the aforementioned binder material may be used.

The negative-electrode active material layer contains at least a negative-electrode active material and, if necessary, may contain at least one of a solid electrolyte, a conductive auxiliary agent, and a binder material similar to that of the positive-electrode active material layer.

As the negative-electrode active material, a generally known material that is capable of occlusion and ejection (insertion and desorption or dissolution and deposition) of lithium ions, sodium ions, or magnesium ions may be used. In the case of a material that is capable of desorption and insertion of lithium ions, for example, a carbon material such as natural graphite, synthetic graphite, graphite carbon fiber, or resin heat-treated carbon, metal lithium, a lithium alloy, an oxide of lithium and a transition metal element, or other substances are used as the negative-electrode active material.

In the case of manufacture of a battery, it is common, as mentioned above, to make the area of a negative-electrode active material layer larger than the area of a positive-electrode active material layer in plan view for the purpose of improving reliability. Furthermore, disposing ends of the negative-electrode active material layer further toward the outside than ends of the positive-electrode active material layer makes it possible to suppress the concentration of electric fields at the ends of the negative-electrode active material layer to inhibit dendrite growth (deposition of metal).

The following describes batteries 950 and 950a according to a comparative example in which the area of a negative-electrode active material layer is larger than the area of a positive-electrode active material layer in plan view. FIGS.

3 and 4 are schematic cross-sectional views showing examples of the batteries according to the comparative example.

Figure 3:
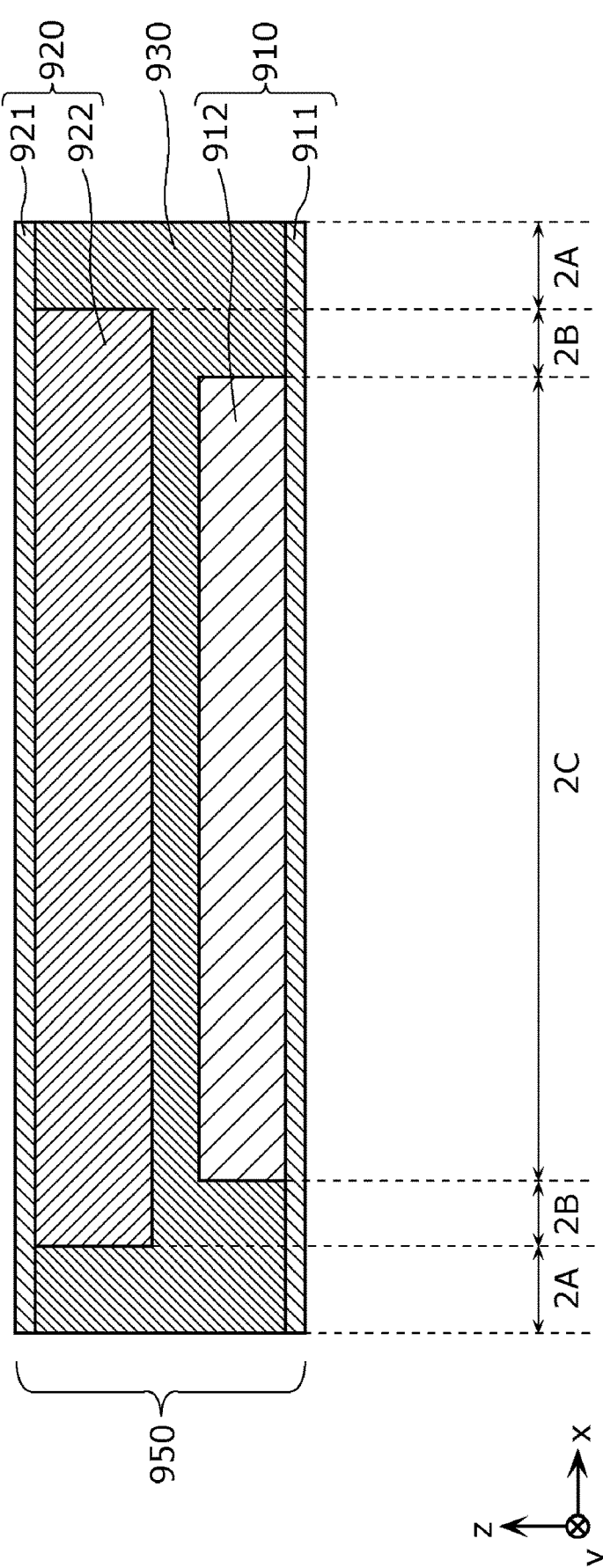
FIG. 3 is a schematic cross-sectional view showing an example of a battery according to a comparative example.

As shown in FIG. 3, the battery 950 includes a positive-electrode layer 910, a negative-electrode layer 920, and a solid electrolyte layer 930 located between the positive-electrode layer 910 and the negative-electrode layer 920. The positive-electrode layer 910 includes a collector 911 and a positive-electrode active material layer 912 located between the collector 911 and the solid electrolyte layer 930. The negative-electrode layer 920 includes a collector 921 and a negative-electrode active material layer 922 located between the collector 921 and the solid electrolyte layer 930. The solid electrolyte layer 930 covers side surfaces of the positive-electrode active material layer 912 and the negative-electrode active material layer 922, and is in contact with the collector 911 and the collector 921. In a plan view of the battery 950, the area of the negative-electrode active material layer 922 is larger than the area of the positive-electrode active material layer 912, and ends of the negative-electrode active material layer 922 are located further toward the outside than ends of the positive-electrode active material layer 912. Thus, in the battery 950, deposition of metal is suppressed by making the area of the negative-electrode active material layer 922 is larger than the area of the positive-electrode active material layer 912. Further, the presence of the solid electrolyte layer 930 at ends of the battery 950 reduces exposure of the positive-electrode active material layer 912 and the negative-electrode active material layer 922 even in a case where the collector 911 and the collector 921 delaminate from the ends.

A region 2C where the positive-electrode active material layer 912 and the negative-electrode active material layer 922 are present functions as a battery. Meanwhile, a region 2A where neither the positive-electrode active material layer 912 nor the negative-electrode active material layer 922 is present does not function as a battery. Further, a region 2B where the negative-electrode active material layer 922 is present but the positive-electrode active material layer 912 is not present does not function as a battery, either. The region 2B is a region that is equivalent to the difference in area between the positive-electrode active material layer 912 and the negative-electrode active material layer 922. As the region 2B and the region 2A become wider in plan view, the proportion of regions in the battery 950 that do not contribute to power generation increases, with the result that the volume energy density of the battery 950 decreases. Meanwhile, as the region 2B becomes narrower in plan view, higher alignment accuracy is required in manufacturing steps such as steps of laminating the respective layers, and the higher-accuracy requirements entail concern about an increase in the number of steps such as inspections and an increase in facility cost.

That is, the battery 950 is undesirably hard to easily manufacture. Further, since the region 2A, whose sole through-thickness layer is the solid electrolyte layer 930, is a portion that does not particularly contribute to the basic charge-discharge performance of the battery, it is preferable, from the point of view of improving the volume energy density, that the region 2A be small.

Figure 4:
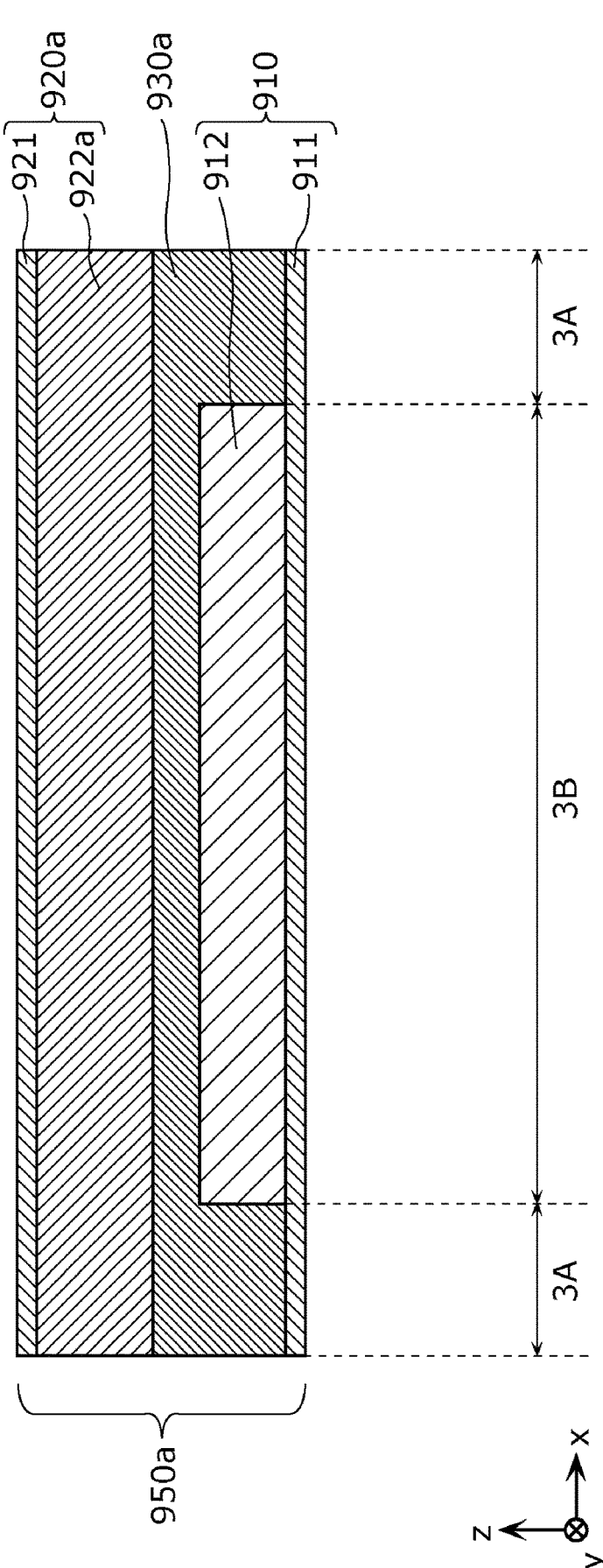
FIG. 4 is a schematic cross-sectional view showing another example of a battery according to the comparative example.

Further, the battery 950 shown in FIG. 4 includes a positive-electrode layer 910a having a collector 911a and a positive-electrode active material layer 912a, a negative-electrode layer 920a having a collector 921a and a negative-electrode active material layer 922a, and a solid electrolyte layer 930a. The battery 950a differs from the battery 950 in that the solid electrolyte layer 930a does not cover a side surface of the negative-electrode active material layer 922a. The battery 950a does not have a region, such as the region 2A, where neither the positive-electrode active material layer 912 nor the negative-electrode active material layer 922 is present, but has a region 3A where the positive-electrode active material layer 912a is not present. Therefore, the region 3A does not contribute to power generation, and a problem similar to that which arises in the region 2B arises in the region 3A of the battery 950a too.

Meanwhile, as mentioned above, the battery 50 includes an electrode layer 10, a counter-electrode layer 20 placed opposite to the electrode layer 10, and a solid electrolyte layer 30 located between the electrode layer 10 and the counter-electrode layer 20. The electrode layer 10 includes a collector 11, an electrode active material layer 12 located between the collector 11 and the solid electrolyte layer 30, and an insulating layer 13 located between the collector 11 and the solid electrolyte layer 12 at ends of the electrode layer 10 in plan view. Further, the battery 50 has an air gap 14 that is in contact with the insulating layer 13 and that divides the electrode active material layer 12 into an electrode active material layer 12a and an electrode active material layer 12b. A side surface of the insulating layer 13 and a side surface of the collector 11 are flush with each other. Furthermore, the respective side surfaces of the collector 11, the insulating layer 13, the electrode active material layer 12b of the electrode active material layer 12, the solid electrolyte layer 30, the counter-electrode active material layer 22, and the collector 21 are flush with one another.

As a result, although the electrode active material layer 12 of the battery 50 expands and contracts during charge and discharge, the stress attributed to the expansion and contraction of the electrode active material layer 12 can be relaxed by the air gap 14, as the electrode active material layer 12 and the air gap 14 are located between the collector 11 and the solid electrolyte layer 30. This reduces the likelihood of interlayer delamination between the electrode active material layer 12 and anther constituent element. This brings about improvement in reliability of the battery 50.

Further, since the insulating layer 13, which is different in material from the collector 11, is formed on top of the collector 11, the air gap 14, which makes contact with the insulating layer 13, can be easily formed by utilizing the difference in property between the respective materials of the electrode active material layer 12 and the insulating layer 13.

Further, even if the collector 11 delaminates at the ends of the collector 11, at which delamination tends to occur, exposure of the electrode active material layer 12b is reduced, as the insulating layer 13 is present between the collector 11 and the electrode active material layer 12b, so that it becomes hard for damage, a short circuit, or other failures to occur due to contact between the electrode active material layer 12b and another member. This brings about improvement in reliability of the battery 50.

Since the respective side surfaces of the collector 11, the insulating layer 13, the electrode active material layer 12b, the solid electrolyte layer 30, the counter-electrode active material layer 22, and the collector 21 are flush with one another, the battery 50 can be manufactured with the area of the insulating layer 13 easily adjusted, for example, by collectively cutting the layers. Therefore, although the presence of the air gap 14, which makes contact with the insulating layer 13, inhibits the electrode active material layer 12b from functioning as an electrode, the region can be minimized by adjusting the area of the insulating layer 13. This makes it possible to increase the volume energy density of the battery.

Further, in the battery 50, for example, the electrode layer 10, which includes the electrode active material layer 12, is a positive-electrode layer including a positive-electrode active material layer, and the counter-electrode layer 20, which includes the counter-electrode active material layer 22, is a negative-electrode layer including a negative-electrode active material layer. In this case, the presence of the air gap 14 prevents electrodes from the collector 11 from directly reaching a portion of the positive-electrode active material layer located on top of the insulating layer 13 (i.e. the electrode active material layer 12b of the electrode active material layer 12), so that a portion of the positive-electrode active material layer that is in a region 1A, shown in FIGS. 1 and 2, that is a region outside the region 1B does not function as an electrode. While the presence of the insulating layer 13 alone makes it hard for electrons to reach the portion of the positive-electrode active material layer located on top of the insulating layer 13, the presence of the air gap 14 makes it possible to further inhibit migration of electrons. Meanwhile, a portion of the positive-electrode active material layer that is in the region 1B functions as an electrode. Therefore, in the battery 50, a region outside the region 1B including the region 1A does not function as a battery, and the region 1B functions as a battery. In the battery 50, although the areas of the positive-electrode active material layer and the negative-electrode active material layer (counter-electrode active material layer 22) in plan view are equal, the area of the positive-electrode active material layer in plan view is substantially reduced, as a portion of the positive-electrode active material layer outside the region 1B does not function as an electrode.

Further, since a portion of the positive-electrode active material layer (i.e. the electrode active material layer 12b) placed opposite to the ends of the negative-electrode active material layer does not functions as an electrode. the concentration of electric fields at the ends of the negative-electrode active material layer is suppressed, so that dendrite growth at the ends is inhibited. This brings about improvement in reliability of the battery 50.

Furthermore, at the time of manufacture of the battery 50, it is not necessary to form the positive-electrode active material layer or the negative-electrode active material layer with high position and area accuracy, as the substantive area of the positive-electrode active material can be adjusted by the air gap 14. which is in contact with the insulating layer 13. This makes it possible to easily manufacture the battery 50. For example, the battery 50 is easily manufactured, for example, by cutting, in a region including the insulating layer 13, a laminated body obtained by laminating the positive-electrode layer (electrode layer 10), the solid electrolyte layer 30, and the negative-electrode layer (counter-electrode layer 20).

Modification 1

The following describes Modification 1 of Embodiment 1. The following describes Modification 1 of Embodiment 1 with a focus on differences from Embodiment 1, and omits or simplifies a description of common features.

Figure 5:
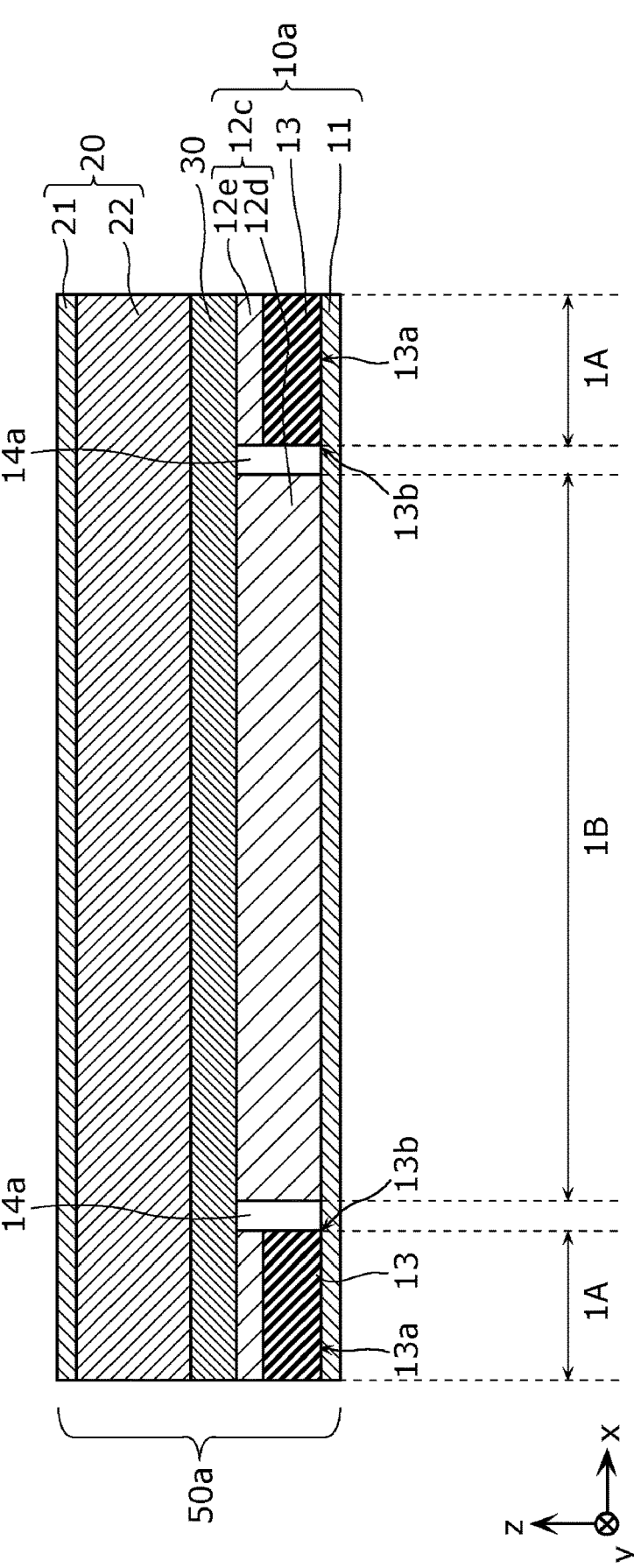
FIG. 5 is a schematic cross-sectional view showing an example of a battery according to Modification 1 of Embodiment 1.

FIG. 5 is a schematic cross-sectional view showing an example of a battery according to the present modification. FIG. 5 shows a cross-section of a battery 50a as taken along the same line as that shown in FIG. 2. As shown in FIG. 5, the battery 50a according to the present modification differs from the battery 50 according to Embodiment 1 in that the battery 50a has an air gap 14a instead of the air gap 14.

The battery 50a according to the present modification includes an electrode layer 10a, a counter-electrode layer 20 placed opposite to the electrode layer 10a, and a solid electrolyte layer 30 located between the electrode layer 10a and the counter-electrode layer 20. Further, the battery 50a has an air gap 14a, located between the collector 11 and the solid electrolyte layer 30, that is in contact with an insulating layer 13.

The electrode layer 10a includes a collector 11, an electrode active material layer 12c located between the collector 11 and the solid electrolyte layer 30, and an insulating layer 13 located between the collector 11 and the solid electrolyte layer 30 and bonded to the collector 11 at ends of the electrode layer 10 in plan view. The electrode active material layer 12c is constituted by electrode active material layers 12d and 12e separated from each other by the air gap 14a.

The electrode active material layer 12c has a region that does not overlap the insulating layer 13 in plan view. Specifically, in a plan view, the electrode active material layer 12d does not overlap the insulating layer 13, and the electrode active material layer 12e completely overlaps the insulating layer 13 and is identical in shape and position to the insulating layer 13.

The air gap 14a is located between the insulating layer 13 and the electrode active material layer 12d, and is in contact with the insulating layer 13. Specifically, the air gap 14a is in contact with an inner side surface of the insulating layer 13. The air gap 14a is further in contact with the collector 11 and the solid electrolyte layer 30. The air gap 14a is located astride the collector 11 and the solid electrolyte layer 30, and causes the collector 11, the insulating layer 13, and the solid electrolyte layer 30 to be exposed. This increases the area of contact between the air gap 14a and the electrode active material layer 12c, thus making it possible to further relax the stress attributed to expansion and contraction of the electrode active material layer 12c during charge and discharge.

Further, the air gap 14a overlaps an inner end 13b of a bonded surface 13a between the insulating layer 13 and the collector 11 in plan view. The air gap 14a is formed inward from the inner side surface of the insulating layer 13 along the inner side surface of the insulating layer 13 in plan view.

Thus, in the battery 50a according to the present modification too, the presence of the air gap 14a relaxes the stress during expansion and contraction of the electrode active material layer 12c, prevents a region outside the region 1B including the region 1B from functioning as a battery, and causes the region 1B to function as a battery. For these and other reasons, the battery 50a brings about a reliability-improving effect that is similar to that brought about by the battery 50.

Modification 2

The following describes Modification 2 of Embodiment 1. The following describes Modification 2 with a focus on differences from Embodiment 1, and omits or simplifies a description of common features.

Figure 6:
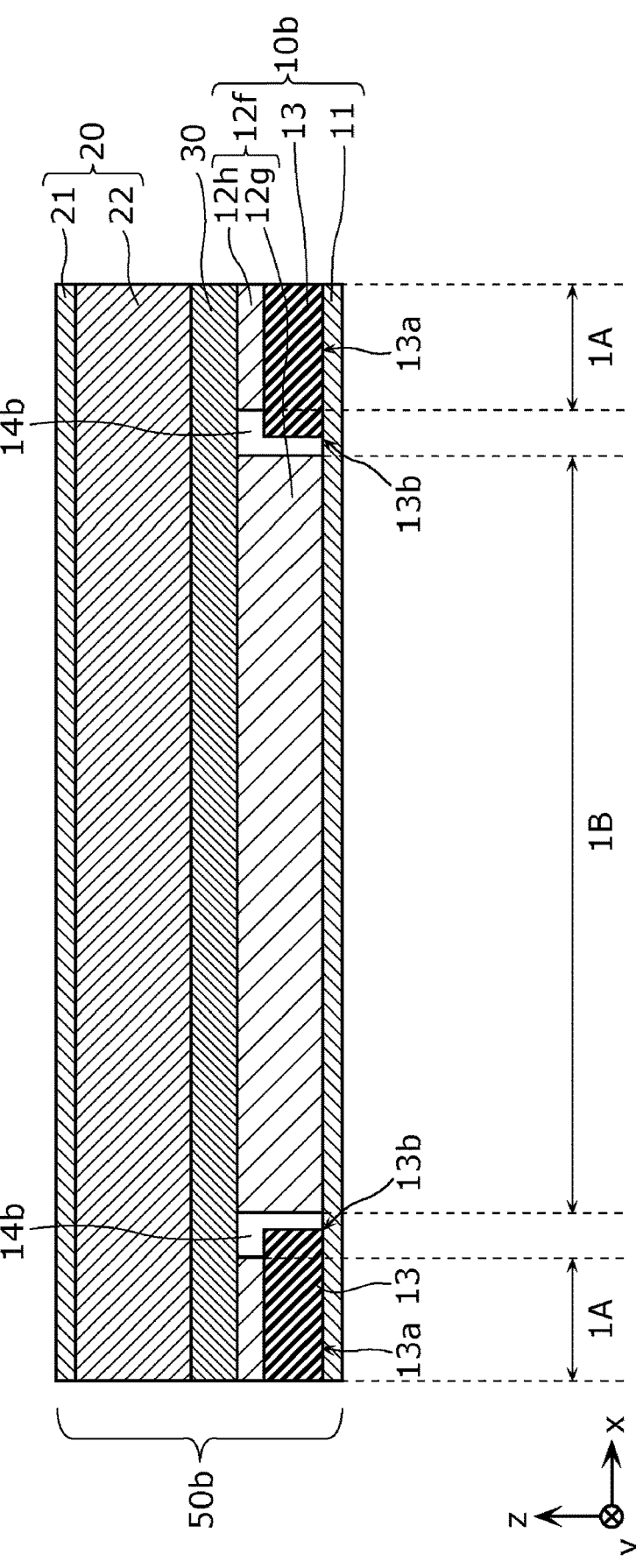
FIG. 6 is a schematic cross-sectional view showing an example of a battery according to Modification 2 of Embodiment 1.

FIG. 6 is a schematic cross-sectional view showing an example of a battery according to the present modification. FIG. 6 shows a cross-section of a battery 50b as taken along the same line as that shown in FIG. 2. As shown in FIG. 6, the battery 50b according to the present modification differs from the battery 50 according to Embodiment 1 in that the battery 50b has an air gap 14b instead of the air gap 14.

The battery 50*b* according to the present modification includes an electrode layer 10*b*, a counter-electrode layer 20 placed opposite to the electrode layer 10*b*, and a solid electrolyte layer 30 located between the electrode layer 10*b* and the counter-electrode layer 20. Further, the battery 50*b* has an air gap 14*b*, located between the collector 11 and the solid electrolyte layer 30, that is in contact with an insulating layer 13.

The electrode layer 10*b* includes a collector 11, an electrode active material layer 12*f* located between the collector 11 and the solid electrolyte layer 30, and an insulating layer 13 located between the collector 11 and the solid electrolyte layer 30 and bonded to the collector 11 at ends of the electrode layer 10 in plan view. The electrode active material layer 12*f* is constituted by electrode active material layers 12*g* and 12*h* separated from each other by the air gap 14*b*.

The electrode active material layer 12*f* has a region that does not overlap the insulating layer 13 in plan view. Specifically, in a plan view, the electrode active material layer 12*g* does not overlap the insulating layer 13, and the electrode active material layer 12*h* overlaps the insulating layer 13.

The air gap 14*b* is located between the insulating layer 13 and the solid electrolyte layer 30 and between the insulating layer 13 and the electrode active material layer 12*g*, and is in contact with the insulating layer 13. Specifically, the air gap 14*b* is in contact with an upper surface of the insulating layer 13 and an inner side surface of the insulating layer 13. Further, the air gap 14*b* is further in contact with the collector 11 and the solid electrolyte layer 30. The air gap 14*b* is located astride the insulating layer 13 and the solid electrolyte layer 30 and astride the collector 11 and the solid electrolyte layer 30, and causes the collector 11, the insulating layer 13, and the solid electrolyte layer 30 to be exposed.

Further, the air gap 14*b* overlaps an inner end 13*b* of a bonded surface 13*a* between the insulating layer 13 and the collector 11 in plan view.

Thus, in the battery 50*b* according to the present modification too, the presence of the air gap 14*b* relaxes the stress during expansion and contraction of the electrode active material layer 12*f*, prevents a region outside the region 1B including the region 1A from functioning as a battery, and causes the region 1B to function as a battery. For these and other reasons, the battery 50*b* brings about a reliability-improving effect that is similar to that brought about by the battery 50.

Modification 3

The following describes Modification 3 of Embodiment 1. The following describes Modification 3 with a focus on differences from Embodiment 1, and omits or simplifies a description of common features.

Figure 7:
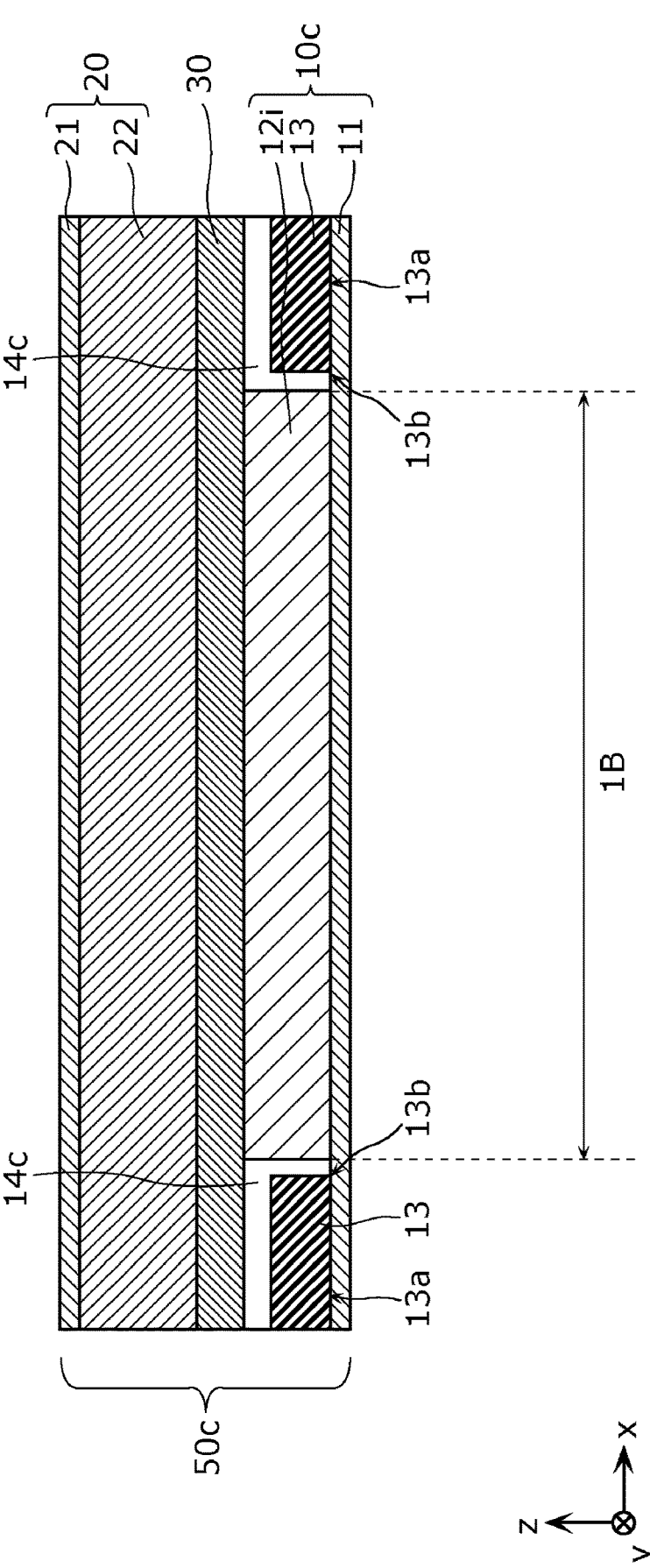
FIG. 7 is a schematic cross-sectional view showing an example of a battery according to Modification 3 of Embodiment 1.

FIG. 7 is a schematic cross-sectional view showing an example of a battery according to the present modification. FIG. 7 shows a cross-section of a battery 50*c* as taken along the same line as that shown in FIG. 2. As shown in FIG. 7, the battery 50*c* according to the present modification differs from the battery 50 according to Embodiment 1 in that battery 50*c* has an air gap 14*c* instead of the air gap 14.

The battery 50*c* according to the present modification includes an electrode layer 10*c*, a counter-electrode layer 20 placed opposite to the electrode layer 10*c*, and a solid electrolyte layer 30 located between the electrode layer 10*c* and the counter-electrode layer 20. Further, the battery 50*c* has an air gap 14*c*, located between the collector 11 and the solid electrolyte layer 30, that is in contact with an insulating layer 13.

The electrode layer 10*c* includes a collector 11, an electrode active material layer 12*i* located between the collector 11 and the solid electrolyte layer 30, and an insulating layer 13 located between the collector 11 and the solid electrolyte layer 30 and bonded to the collector 11 at ends of the electrode layer 10 in plan view.

A lower surface of the electrode active material layer 12*i* is in contact with the collector 11. Further, the electrode active material layer 12*i* and the insulating layer 13 are not in contact with each other.

The air gap 14*c* is located between the insulating layer 13 and the solid electrolyte layer 30 and between the insulating layer 13 and the electrode active material layer 12*i*, and is in contact with the insulating layer 13. Specifically, the air gap 14*c* is in contact with an upper surface of the insulating layer 13 and the whole side surface of the insulating layer 13. That is, the air gap 14*c* causes the upper and inner side surfaces of the insulating layer 13 to be wholly exposed, and the electrode active material layer 12*i* and the insulating layer 13 are not in contact with each other. This enlarges the air gap in the battery 50*c*, making it possible to further relax the stress of expansion and contraction of the electrode active material layer 12*i* during charge and discharge.

Further, the air gap 14*c* overlaps an inner end 13*b* of a bonded surface 13*a* between the insulating layer 13 and the collector 11 in plan view.

Thus, in the battery 50*c* according to the present modification too, the presence of the air gap 14*c* relaxes the stress during expansion and contraction of the electrode active material layer 12*i*, prevents a region outside the region 1B including the region 1A from functioning as a battery, and causes the region 1B to function as a battery. For these and other reasons, the battery 50*c* brings about a reliability-improving effect that is similar to that brought about by the battery 50.

Modification 4

The following describes Modification 4 of Embodiment 1. The following describes Modification 4 with a focus on differences from Embodiment 1, and omits or simplifies a description of common features.

Figure 8:
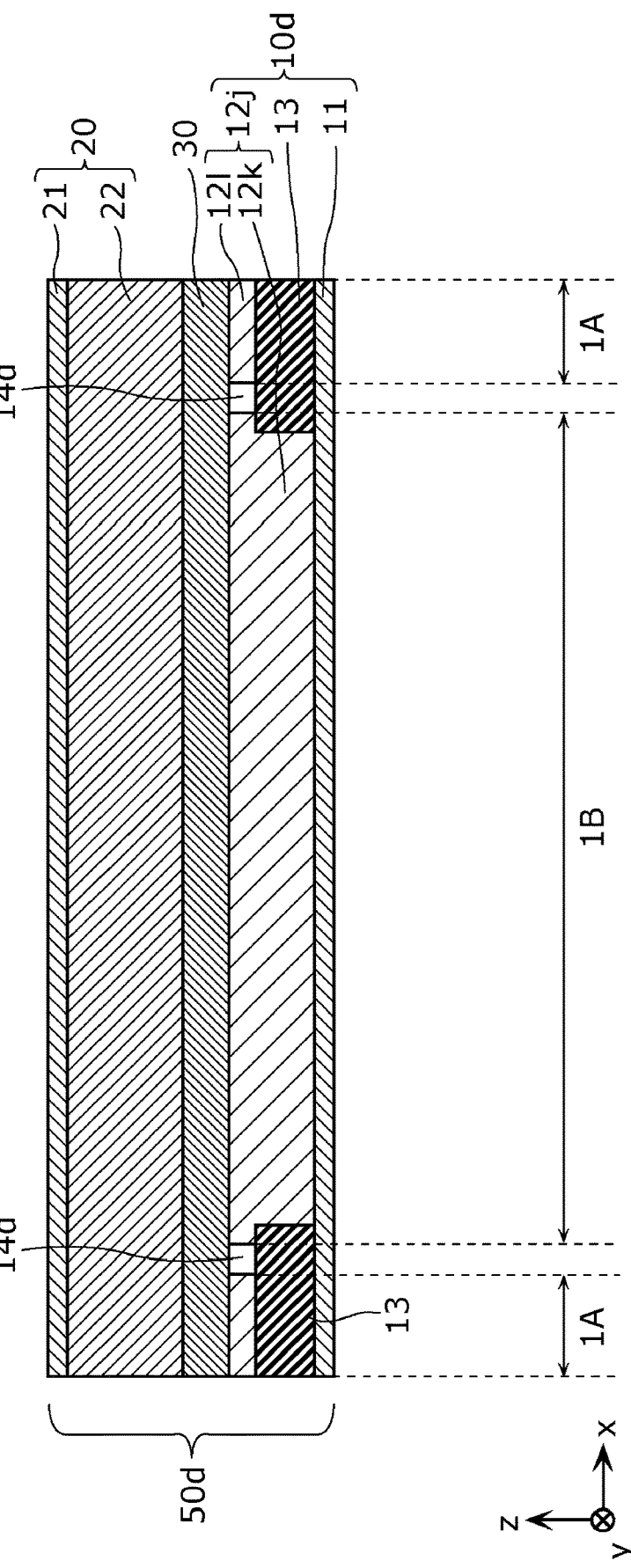
FIG. 8 is a schematic cross-sectional view showing an example of a battery according to Modification 4 of Embodiment 1.

FIG. 8 is a schematic cross-sectional view showing an example of a battery according to the present modification. FIG. 8 shows a cross-section of a battery 50*d* as taken along the same line as that shown in FIG. 2. As shown in FIG. 8, the battery 50*d* according to the present modification differs from the battery 50 according to Embodiment 1 in that the battery 50*d* has an air gap 14*d* instead of the air gap 14.

The battery 50*d* according to the present modification includes an electrode layer 10*d*, a counter-electrode layer 20 placed opposite to the electrode layer 10*d*, and a solid electrolyte layer 30 located between the electrode layer 10*d* and the counter-electrode layer 20. Further, the battery 50*d* has an air gap 14*d*, located between the collector 11 and the solid electrolyte layer 30, that is in contact with an insulating layer 13.

The electrode layer 10*d* includes a collector 11, an electrode active material layer 12*j* located between the collector 11 and the solid electrolyte layer 30, and an insulating layer 13 located between the collector 11 and the solid electrolyte layer 30 and bonded to the collector 11 at ends of the electrode layer 10 in plan view. The electrode active material layer 12*j* is constituted by electrode active material layers 12*k* and 12*l* separated from each other by the air gap 14*d*.

A lower surface of the electrode active material layer 12*k* is in contact with the collector 11. Further, the electrode active material layer 12*k* is in contact with a portion of an upper surface of the insulating layer 13 and a side surface of the insulating layer 13. The electrode active material layer 12*l* is in the shape of a frame in plan view, and surrounds the electrode active material layer 12*k*. A portion of the electrode active material layer 12*k* and the electrode active material layer 12*l* are laminated above the collector 11 so as to cover the insulating layer 13, which is on top of the collector 11. The electrode active material layer 12*j* has a region that does not overlap the insulating layer 13 in plan view. Specifically, in a plan view, the portion of the electrode active material layer 12*k* does not overlap the insulating layer 13, and the electrode active material layer 12*l* overlaps the insulating layer 13.

The air gap 14*d* is located between the insulating layer 13 and the solid electrolyte layer 30, and is in contact with the insulating layer 13. Further, the air gap 14*d* is formed in such a place as to overlap the insulating layer 13, which in the shape of a frame in plan view, along the direction of extension of the insulating layer 13.

Thus, in the battery 50*d* according to the present modification too, the presence of the air gap 14*d* relaxes the stress during expansion and contraction of the electrode active material layer 12*k*, prevents a region outside the region 1B including the region 1A from functioning as a battery, and causes the region 1B to function as a battery. For these and other reasons, the battery 50*d* brings about a reliability-improving effect that is similar to that brought about by the battery 50.

Manufacturing Method

The following describes a method for manufacturing a battery according to the present embodiment. The following gives a description with a focus on the aforementioned method for manufacturing a battery 50 according to Embodiment 1. Other batteries 50*a*, 50*b*, 50*c*, and 50*d* can be manufactured in a similar manner. It should be noted that the following method for manufacturing a battery 50 is just an example, and the method for manufacturing a battery 50 is not limited to the following example.

The method for manufacturing a battery 50 includes an insulating layer laminating step, a power-generating element laminating step, a cutting step, and a collector laminating step. The following describes each of the steps in detail.

(1) Insulating Layer Laminating Step

Figure 9:
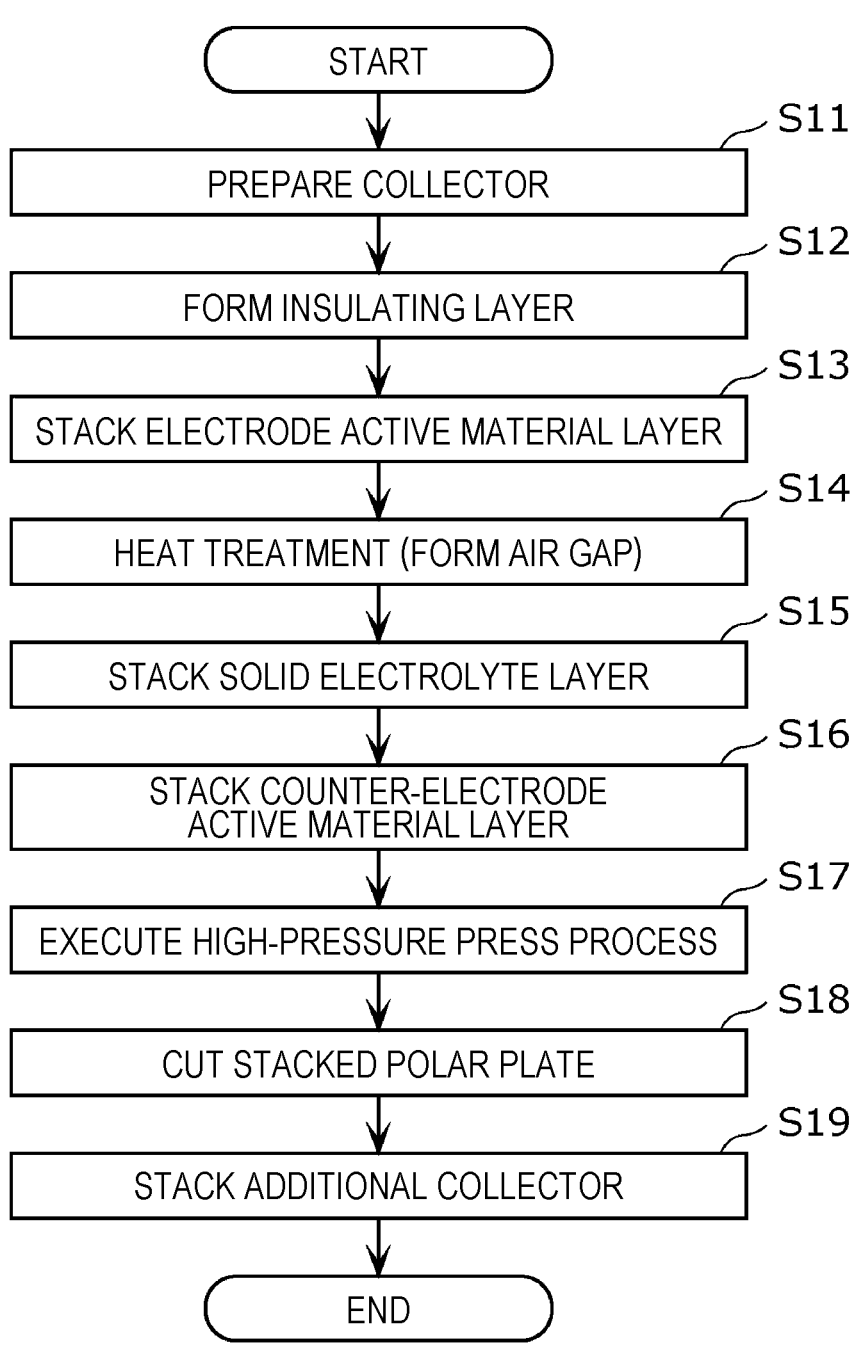
FIG. 9 is a flow chart for explaining a method for manufacturing a battery according to Embodiment 1.

First, the insulating layer laminating step is described. FIG. 9 is a flow chart for explaining a method for manufacturing a battery according to the present embodiment.

In the insulating layer laminating step, an insulating layer 13 is laminated on at least one surface of a collector 11. Specifically, first, the collector 11 is prepared (step S11 of FIG. 9). Then, the insulating layer 13 is laminated on at least one surface of the collector 11 thus prepared (step S12 of FIG. 9). For example, the insulating layer 13 is laminated on the collector 11 by forming the insulating layer 13 on an upper surface of the collector 11.

Figure 10A:
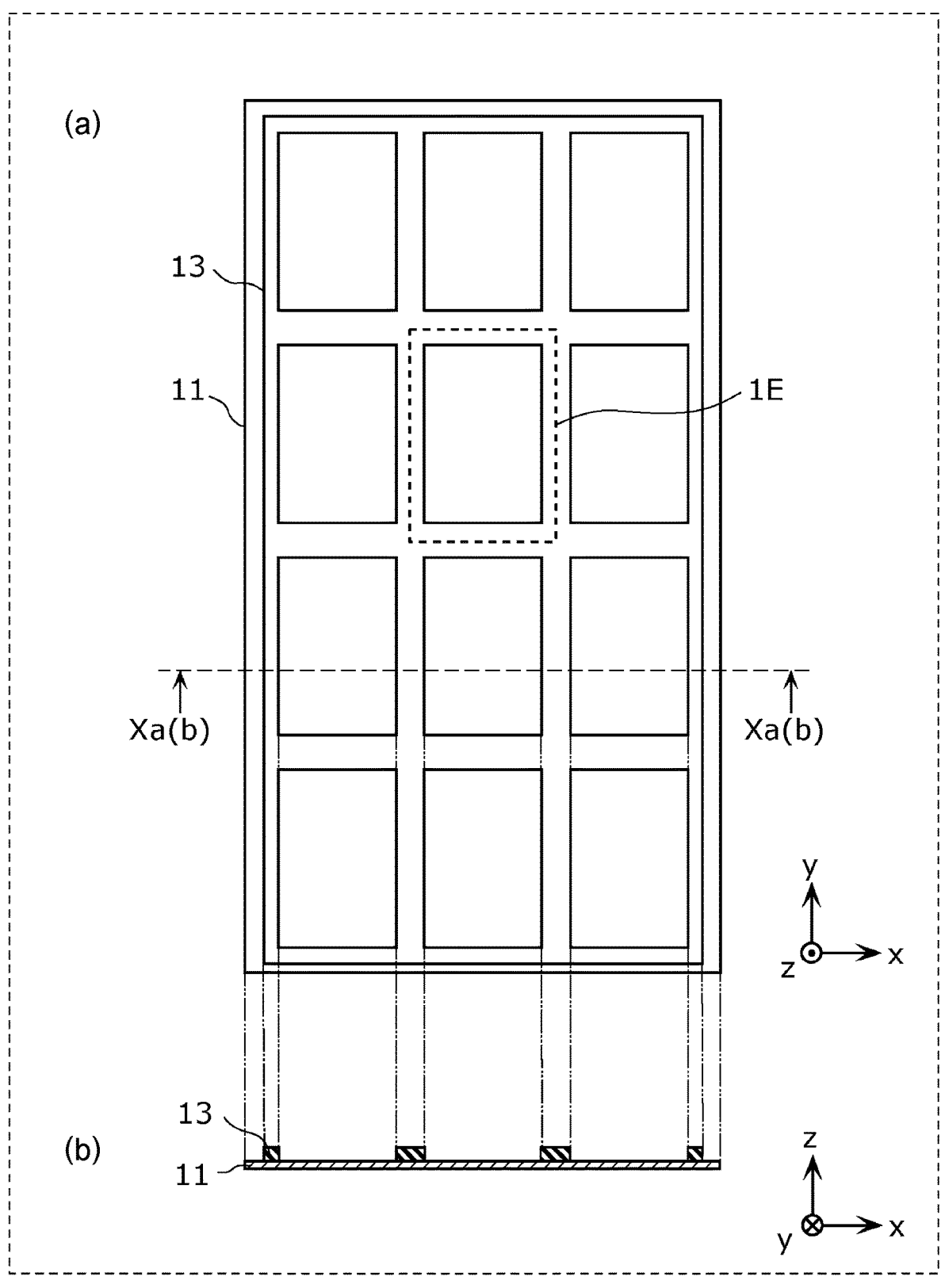
FIG. 10A illustrates a schematic top view and a schematic cross-sectional view showing an example of a laminated combination of a collector and an insulating layer according to Embodiment 1.
Figure 10B:
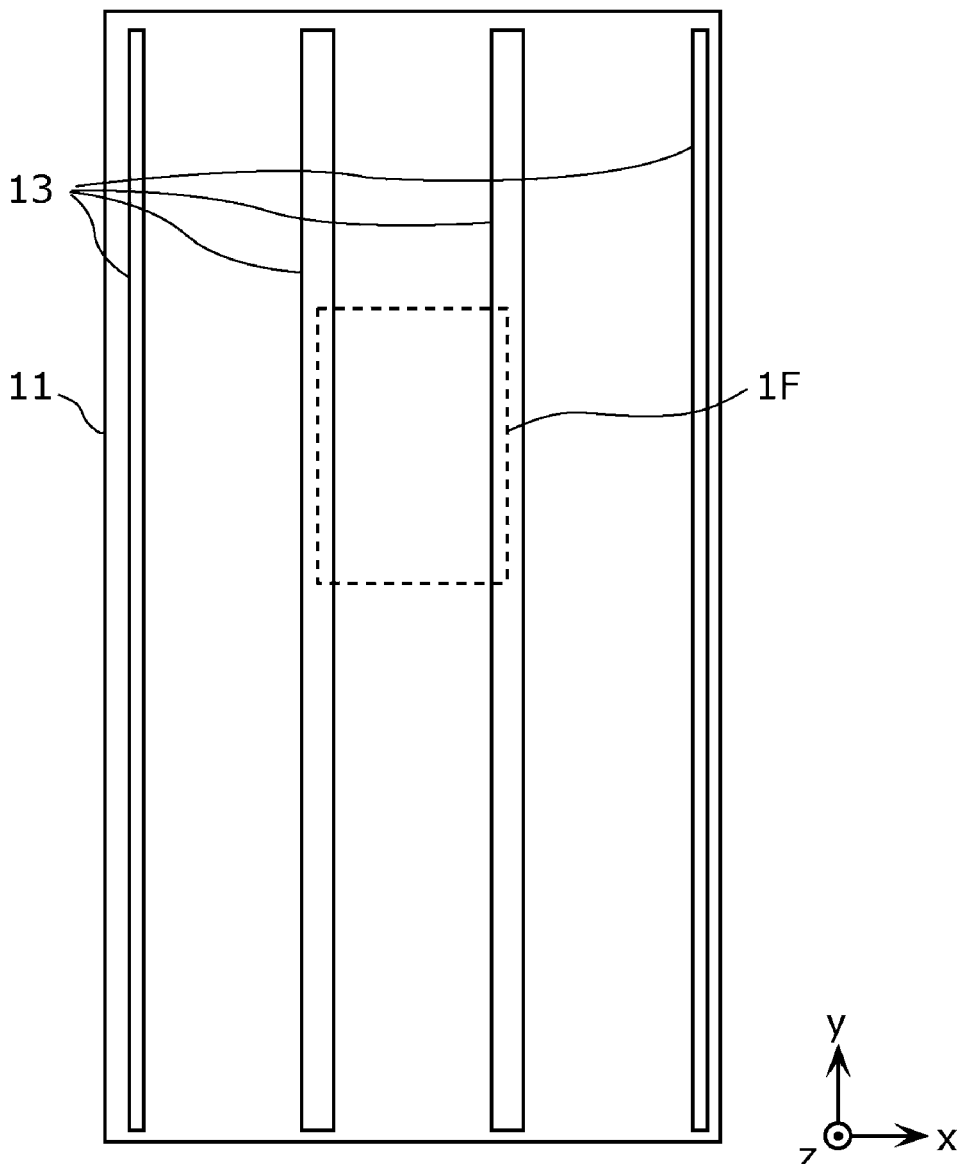
FIG. 10B is a schematic top view showing another example of a laminated combination of a collector and an insulating layer according to Embodiment 1.
Figure 10C:
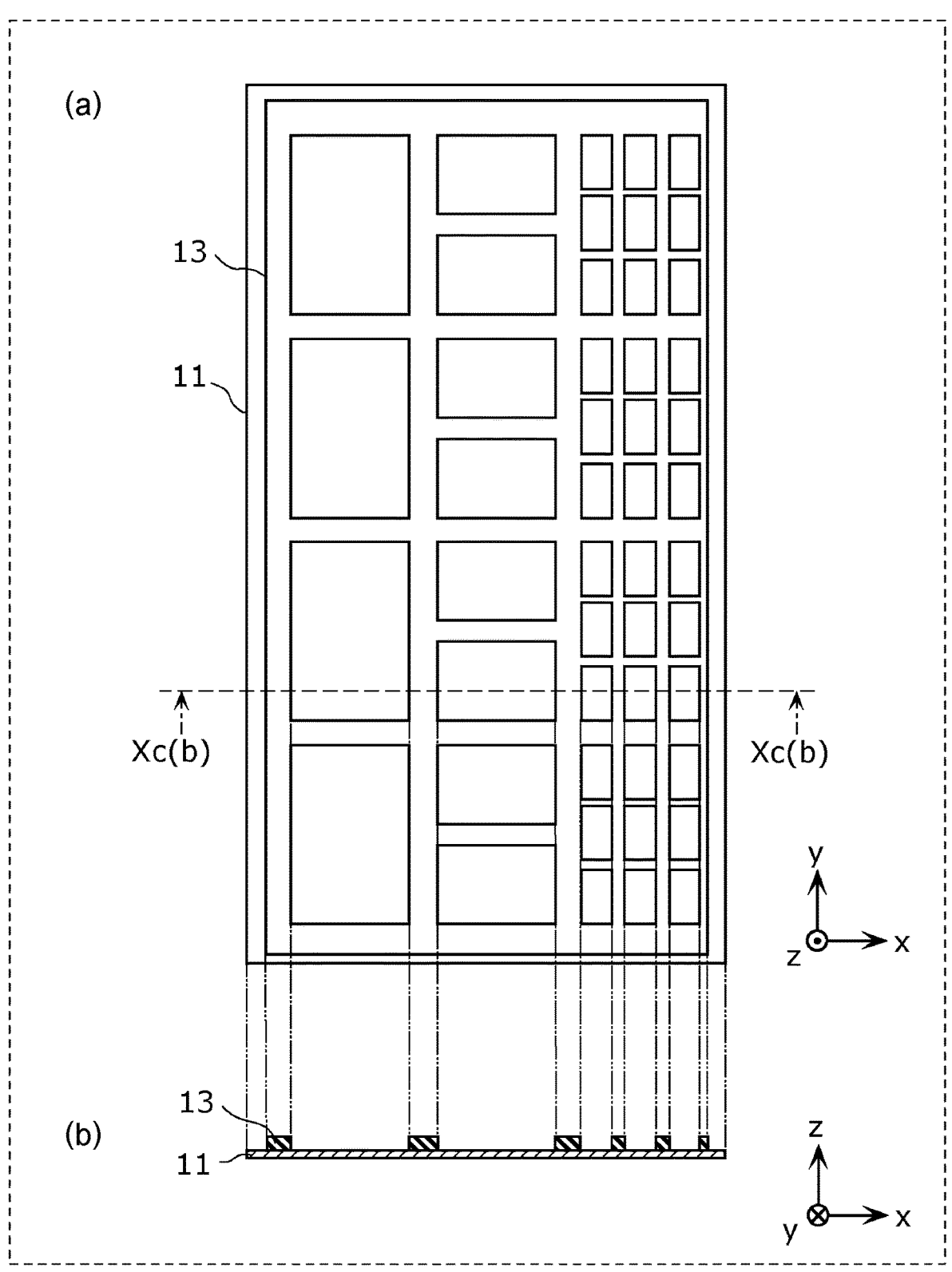
FIG. 10C illustrates a schematic top view and a schematic cross-sectional view showing another example of a laminated combination of a collector and an insulating layer according to Embodiment 1.

FIGS. 10A, 10B, and 10C are schematic views showing examples of laminated combinations of a collector 11 and an insulating layer 13. (a) of FIG. 10A is a schematic top view showing an example of a laminated combination of a collector 11 and an insulating layer 13, and (b) of FIG. 10A is a schematic cross-sectional view taken along line Xa(b)-

Xa(b) in (a) of FIG. 10A. For example, as shown in FIG. 10A, the insulating layer 13 is formed into a grating shape. Further, FIG. 10B is a schematic top view showing another example of a laminated combination of a collector 11 and an insulating layer 13. Although FIG. 10B does not illustrate a cross-sectional view, the laminated combination of the collector 11 and the insulating layer 13 shown in FIG. 10B has a cross-sectional structure similar to that of (b) of FIG. 10A. As shown in FIG. 10B, the insulating layer 13 may be formed into a striped shape. By thus laminating the insulating layer 13 into a comparatively simple shape in plan view, such as a grating shape or a striped shape, having an elongated portion, the insulating layer 13 can be easily formed on the collector 11. Further, by the insulating layer 13 being divided along a direction parallel with the length of the insulating layer 13 in the after-mentioned cutting step, a battery 50 can be easily formed with the insulating layer 13 formed along ends of the battery 50. FIGS. 10A and 10B, rectangular regions 1E and 1F indicated by dotted lines are equivalent to the size of one battery 50. Thus, the insulating layer 13 may be laminated on the collector 11 so that the insulating layer 13 can be divided into a plurality of batteries in a later manufacturing step.

Further, (a) of FIG. 10C is a schematic top view showing still another example of a laminated combination of a collector 11 and an insulating layer 13, and (b) of FIG. 10C is a schematic cross-sectional view taken along line Xc(b)-Xc(b) in (a) of FIG. 10C. As shown in FIG. 10C, a grating-shaped insulating layer 13 of multiple types of pattern (e.g. grating space) may be formed on top of the collector 11.

By the insulating layer 13 being thus laminated into a grating shape or a striped shape and divided along a direction parallel with the length of the grating shape or the striped shape of the insulating layer 13 in the after-mentioned cutting step, a plurality of batteries 50 of the same shape or different shapes can be simultaneously manufactured. This brings about improvement in efficiency in the manufacture of batteries 50.

As a method for forming the insulating layer 13, there are a variety of possible processes; however, from the point of view of mass-producibility, for example, an application process is used. For example, paint obtained by dispersing an insulating substance (e.g. an inorganic filler) into a solvent is applied onto the collector 11 as a material of the insulating layer 13 by a high-accuracy coating method such as a gravure roll method or an inkjet method in a continuous process such as a roll-to-roll process, and the solvent is evaporated by drying, whereby the insulating layer 13 can be obtained. This allows the insulating layer 13 to be formed with uniform thickness and high position accuracy. Further, by using such a high-accuracy coating method, the accuracy of the area of the electrode active material layer 12 that is substantially effective as an electrode is increased.

In a case where resin is used as the material of the insulating layer 13, a solution obtained by dissolving or dispersing resin may be applied onto the collector 11, or ultraviolet-curable resin or thermosetting resin may be applied onto the collector 11 and subjected to a curing process. Further, resin containing an inorganic filler may be applied. It should be noted that the formation of the insulating layer 13 is not limited to a continuous process such as a roll-to-roll process, but may be a batch process for forming the insulating layer 13 for each single collector 11.

Further, the material of the insulating layer 13 contains, for example, a material, such as an inorganic filler, that is higher in coefficient of linear expansion than a material of the electrode active material layer 12. Further, the material of the insulating layer 13 may contains the after-mentioned material that is poor in wettability with a slurry of the material of the electrode active material layer 12, i.e. a material, such as fluorine-containing resin, that repels the slurry. Further, the insulating layer 13 may have its surface coated with a coating agent such as a fluorine coating agent for adjustment to attain such surface tension as to repel the slurry.

As the solvent for use in the formation of the insulating layer 13, a common organic solvent, aqueous solvent, or other solvents in which an inorganic filler and/or resin is dispersed or dissolved may be used.

(2) Power-Generating Element Laminating Step

Next, the power-generating element laminating step is described. In the power-generating element laminating step, a power-generating element 40 having an air gap 14 formed therein is formed, for example, by sequentially laminating the electrode active material layer 12, the solid electrolyte layer 30, and the counter-electrode active material layer 22 over the collector 11. For example, over the laminated combination of the collector 11 and the insulating layer 13, the electrode active material layer 12 is laminated so as to cover the insulating layer 13, and the air gap 14 is formed by performing a heat treatment; furthermore, the solid electrolyte layer 30 and the counter-electrode active material layer 22 are sequentially laminated (steps S13, S14, S15, and S16 of FIG. 9). Furthermore, if necessary, a high-pressure press process is performed on the electrode active material layer 12, the solid electrolyte layer 30, and the counter-electrode active material layer 22, which were laminated in steps S13, S15, and S16 (step S17 of FIG. 9). Further, if necessary, a heat treatment is performed on the electrode active material layer 12, the solid electrolyte layer 30, and the counter-electrode active material layer 22, which were laminated in steps S13, S15, and S16. This gives a laminated polar plate in which the power-generating element 40 is laminated on top of the laminated combination of the collector 11 and the insulating layer 13 and the air gap 14, which divides the electrode active material layer 12 into an electrode active material layer 12a and an electrode active material layer 12b, is formed.

The electrode active material layer 12, the solid electrolyte layer 30, and the counter-electrode active material layer 22, which constitute the power-generating element 40, are formed in sequence, for example, by using a wet coating method. The use of the wet coating method makes it possible to easily laminate the power-generating element 40 on the collector 11. Usable examples of the wet coating method include, but are not limited to, coating methods such as a die coating method, a doctor blade method, a roll coater method, a screen printing method, and an inkjet method.

In a case where the wet coating method is used, a paint-making step is executed in which slurries are obtained separately by appropriately mixing together each of the materials that form the electrode active material layer 12, the solid electrolyte layer 30, and the counter-electrode active material layer 22 (i.e. each of the aforementioned materials of the positive-electrode active material layer, the solid electrolyte layer 30, and the negative-electrode active material layer) and a solvent.

As the solvent for use in the paint-making step, a generally known solvent that is used in fabricating a generally known all solid battery (e.g. a lithium-ion all-solid battery) may be used.

The slurries, obtained in the paint-making step, of the respective layers are applied over the laminated combination of the collector 11 and the insulating layer 13. This layered coating is executed in the order of the electrode active material layer 12, the solid electrolyte layer 30, and then the counter-electrode active material layer 22. First, in steps S13 and S14, the electrode active material layer 12 is laminated, and the air gap 14 is formed. The slurry of the electrode active material layer 12 is applied, and after the application, a heat treatment that removes the solvents and the binder materials and a high-pressure press process that accelerates the filling of the materials of the respective layers are executed, for example. In so doing, for example, the air gap 14 is formed by the surface tension of the insulating layer 13 and/or the expansion and contraction of the insulating layer 13 during the heat treatment. Further, in a case where the insulating layer 13 is in a shape, such as a grating shape or a striped shape, having an elongated portion, the air gap 14 is formed, for example, along a direction parallel with the length of the insulating layer 13.

The process of forming the air gap 14 in steps S13 and S14 is described in detail.

Figure 11A:
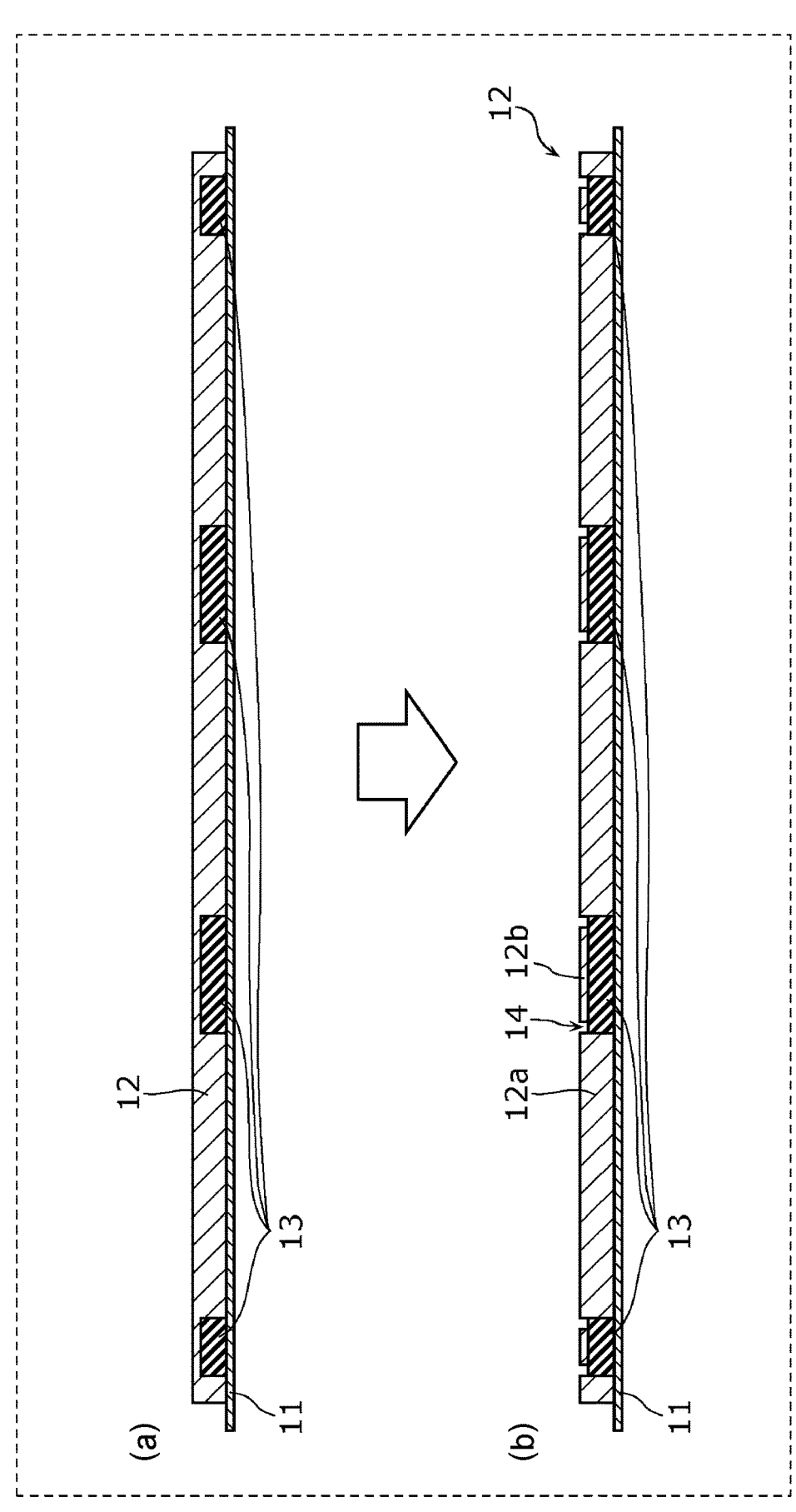
FIG. 11A is a diagram for explaining an example of a method for forming an air gap according to Embodiment 1.

FIG. 11A is a diagram for explaining an example of a method for forming an air gap 14. First, in step S13, as shown in (a) of FIG. 11A, the electrode active material layer 12 is laminated on top of the laminated combination of the collector 11 and the insulating layer 13 by applying the slurry of the material of the electrode active material layer 12 in such as manner as to cover the insulating layer 13. Then, in step S14, a laminated combination of the collector 11 and the electrode active material layer 12 is heat-treated, whereby the collector 11, the electrode active material layer 12, and the insulating layer 13 expand. In so doing, the electrode active material layer 12 is less likely to expand than the insulating layer 13, as a material that is higher in coefficient of linear expansion than the material of the electrode active material layer 12 is used as the material of the insulating layer 13. This causes a force to act so that a portion of the electrode active material layer 12 that is on top of the insulating layer 13 and a portion of the electrode active material layer 12 that is on top of the collector 11 in a place where the insulating layer 13 is not laminated are pulled apart. This results in the formation of the air gap 14, which divides the electrode active material layer 12 into an electrode active material layer 12a and an electrode active material layer 12b, as shown in (b) of FIG. 11A. Thus, in a case where the insulating layer 13 contains an inorganic filler in forming the electrode active material layer 12 by using a wet coating method, selecting an inorganic filler that is higher in coefficient of linear expansion than the electrode active material layer 12 makes it possible to form an insulating layer 13 that is higher in coefficient of linear expansion than the electrode active material layer 12, thus making it easy to form the air gap 14.

Although, in the example shown in FIG. 11A, the air gap 14 is formed at both ends of the upper surface of the insulating layer 13, the place where an air gap is formed is not limited to such an example. The place where an air gap is formed can be adjusted, for example, according to the difference in coefficient of linear expansion between the insulating layer 13 and the electrode active material layer 12, the adhesion strength between the collector 11 and the electrode active material layer 12, and the coefficient of linear expansion of the collector 11.

Figure 11B:
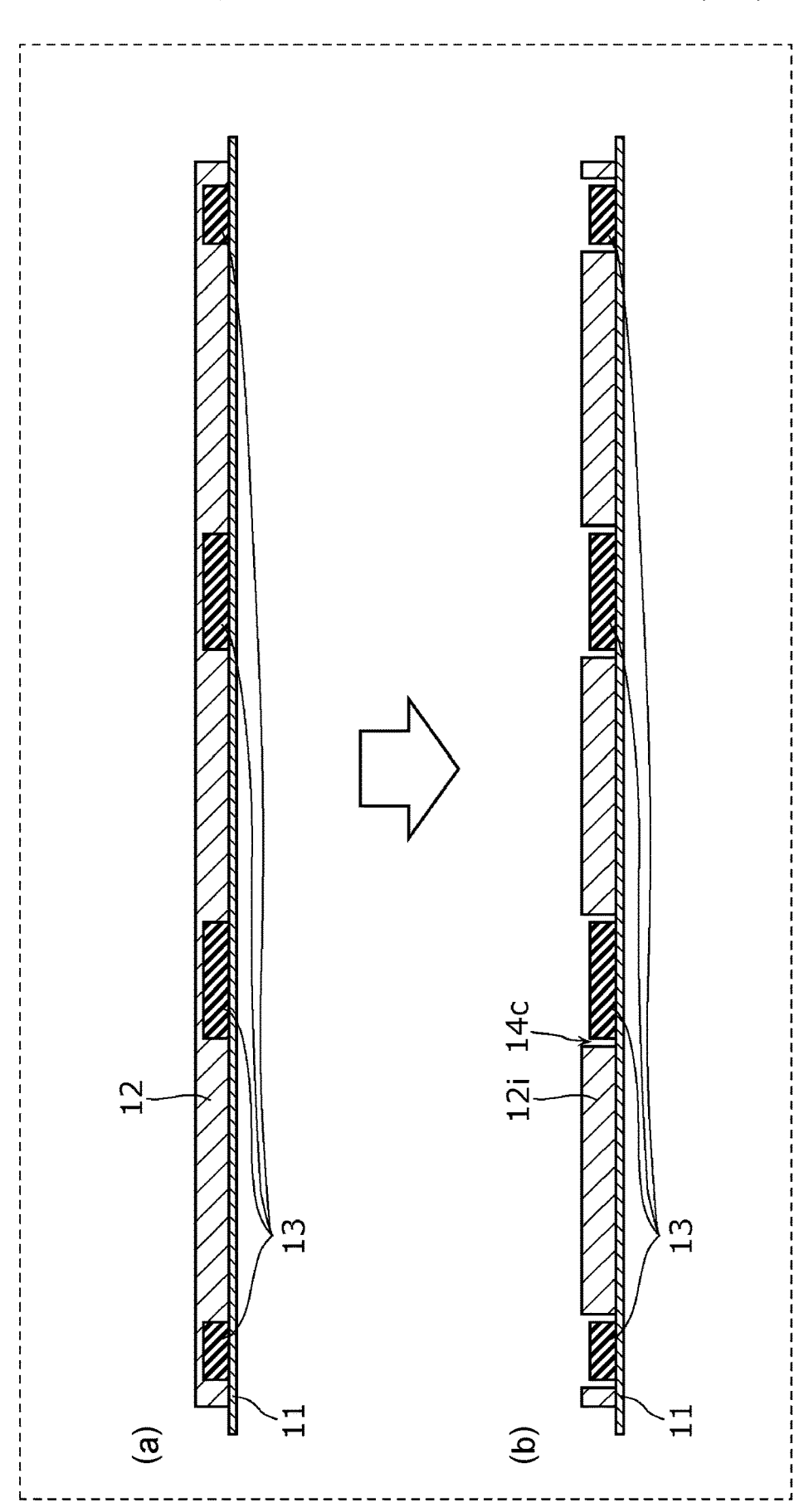
FIG. 11B is a diagram for explaining another example of a method for forming an air gap according to Embodiment 1.

Further, an air gap can also be formed by using a slurry-repelling material (i.e. a material that is poor in wettability with a slurry) in the insulating layer 13. FIG. 11B is a diagram for explaining another example of a method for forming an air gap. First, in step S13, as shown in (a) of FIG. 11B, the electrode active material layer 12 is laminated on top of the laminated combination of the collector 11 and the insulating layer 13 by applying the slurry of the material of the electrode active material layer 12 in such as manner as to cover the insulating layer 13. In so doing, as shown in (b) of FIG. 11B, since the insulating layer 13 contains a material that repels the slurry of the material of the electrode active material layer 12, a portion of the slurry that is in contact with the insulating layer 13 flows, so that the insulating layer 13 becomes exposed. This causes, for example, the air gap 14c to be formed in the battery 50c. Thus, in a case where the insulating layer 13 contains resin in forming the electrode active material layer 12 by using a wet coating method, adjusting the surface tension of the resin makes it possible to form an insulating layer 13 having such surface tension as to repel the slurry, thus making it easy to form the air gap 14c.

Although, in the example shown in FIG. 11B, the air gap 14c is formed such that the upper surface and both side surfaces of the insulating layer 13 are exposed, the place where an air gap is formed is not limited to such an example. The place where an air gap is formed can be adjusted, for example, the wettability of the slurry with respect to the insulating layer 13 and the thickness of the slurry of the material of the electrode active material layer 12 covering the insulating layer 13.

Further, the method for forming an air gap is not limited to the methods described with reference to FIGS. 11A and 11B but may for example be a method in which the material of the electrode active material layer 12 is applied in such a pattern that the electrode active material layer 12 is divided by the air gap.

Then, the solid electrolyte layer 30 and then the counter-electrode active material layer 22 are overlaid in this order. In so doing, the overlaying of a layer being overlaid first may be followed by the overlaying of a next layer, or the overlaying of the next layer may be started during the overlaying of the layer being overlaid first. That is, steps S15 and S16 may be concurrently executed. The slurries of the respective layers are sequentially applied, and after all layers have been applied, a heat treatment that removes the solvents and the binder materials and a high-pressure press process that accelerates the filling of the materials of the respective layers are executed, for example. It should be noted that the heat treatment and the high-pressure press process may be executed each time a layer is overlaid. That is, step S17 may be executed between steps between steps S15 and S16. In the overlaying of the solid electrolyte layer 30 and the counter-electrode active material layer 22, the heat treatment and the high-pressure press process may be executed each time one layer is overlaid or may be executed all at once after all two layers have been overlaid. Further, the high-pressure press process involves the use of, for example, a roll press, a flat-plate press, or other presses. It should be noted that at least one of the heat treatment and the high-pressure press process may not be performed.

Performing a layered coating method in this way makes it possible to improve the bondability of the interface between each of the layers, namely the collector 11, the insulating layer 13, the electrode active material layer 12, the solid electrolyte layer 30, and the counter-electrode active material layer 22, and another and reduce interface resistance, and also makes it possible to improve the bondability between the powder materials used in the electrode active material layer 12, the solid electrolyte layer 30, and the counter-electrode active material layer 22 and reduce grain boundary resistivity. That is, favorable interfaces are formed between each of the layers of the power-generating element 40 and another and between each of the powder materials contained in the respective layers and another.

It should be noted that the insulating layer laminating step and the power-generating element laminating step may be performed in a series of continuous processes such as roll-to-roll processes.

Further, although the solid electrolyte layer 30 and the counter-electrode active material layer 22 are sequentially laminated over a laminated combination of the collector 11, the insulating layer 13, and the electrode active material layer 12 in the power-generating element laminating step, this is not intended to impose any limitation. For example, in the power-generating element laminating step, at least one of a solid electrolyte layer 30 and a counter-electrode active material layer 22 may be formed by sequentially laminating the layer on a sheet-like substrate, and the solid electrolyte layer 30 and the counter-electrode active material layer 22 thus formed may be removed from the substrate and laminated on the laminated combination of the collector 11, the insulating layer 13, and the electrode active material layer 12.

Figure 12A:
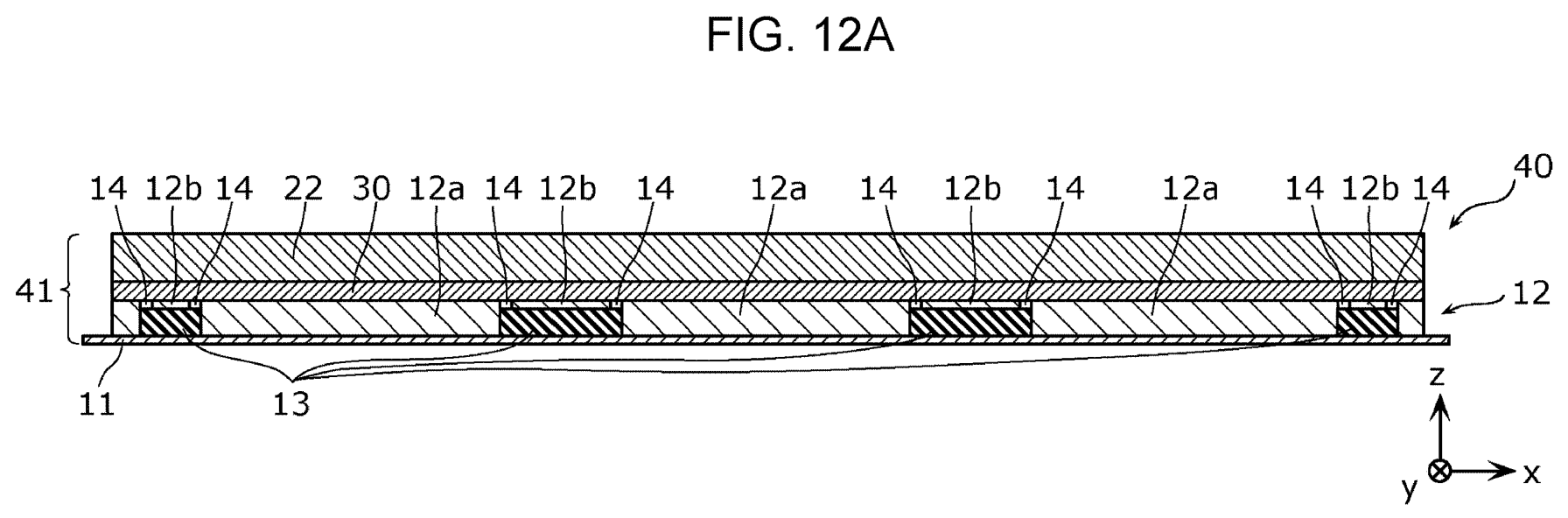
Figure 12B:
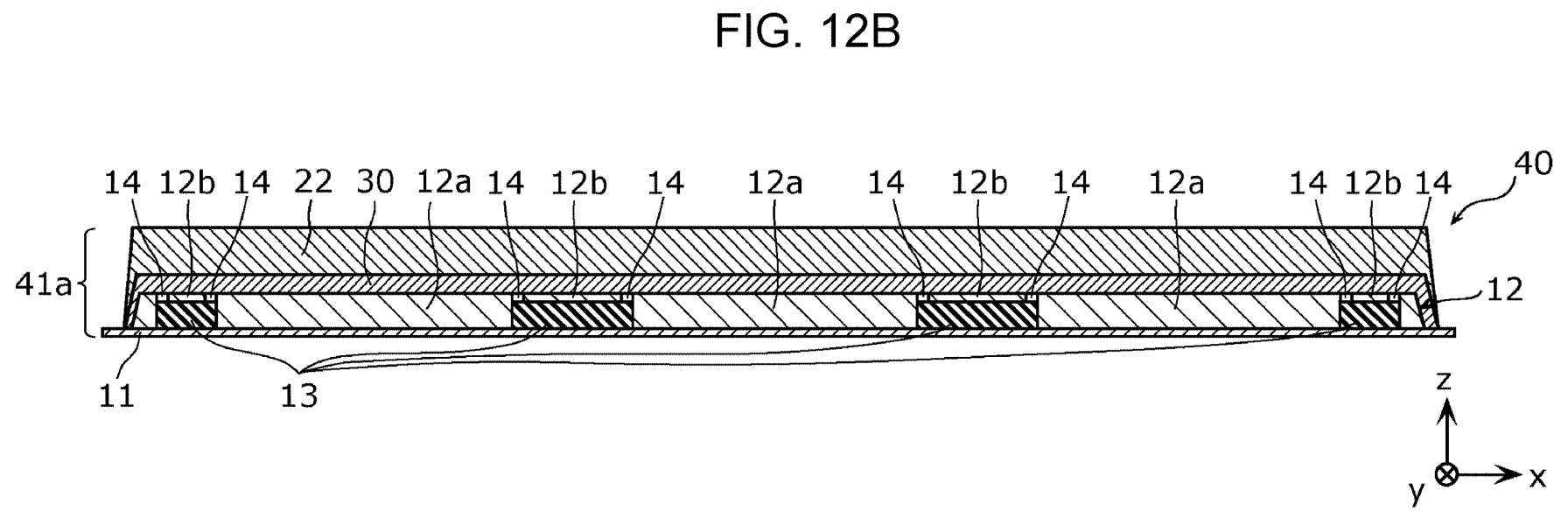
Figure 12C:
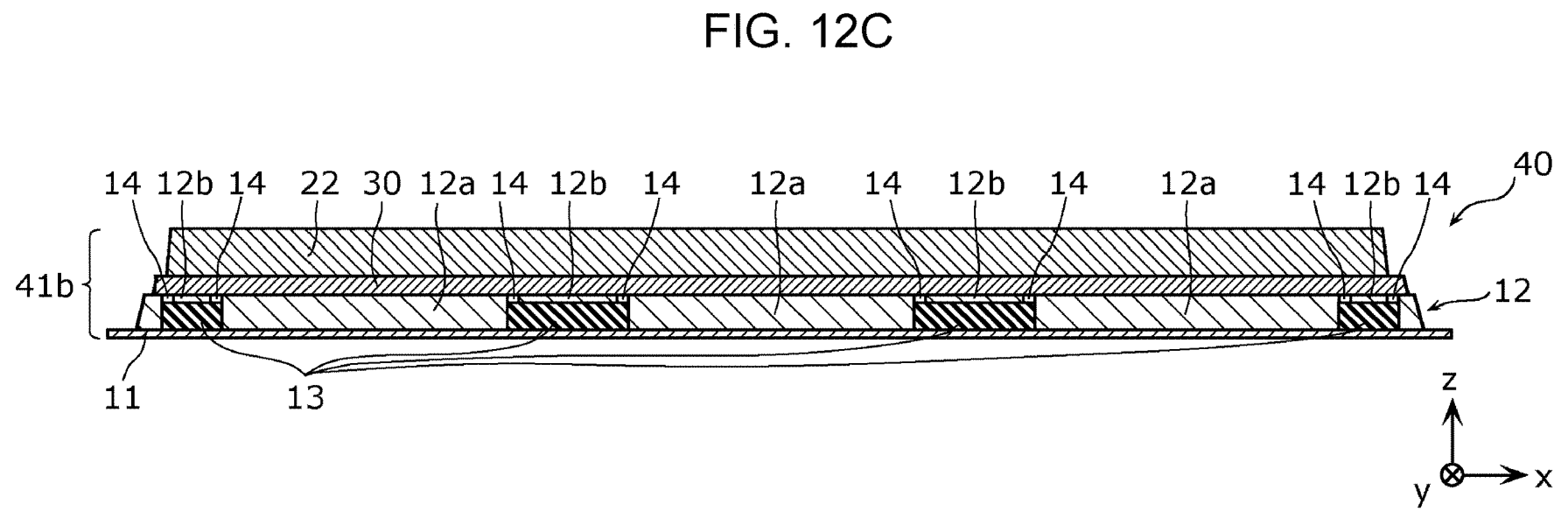

FIGS. 12A, 12B, and 12C are schematic cross-sectional views showing examples of laminated polar plates according to the present embodiment. In a laminated polar plate 41, as shown in FIG. 12A, a power-generating element 40 obtained by laminating an electrode active material layer 12, a solid electrolyte layer 30, and a counter-electrode active material layer 22 in this order is laminated on top of a laminated combination of a collector 11 and insulating layer 13. The power-generating element 40 has formed therein an air gap 14 that divides the electrode active material layer 12 into an electrode active material layer 12a and an electrode active material layer 12b and that makes contact with the insulating layer 13. Further, the counter-electrode active material layer 22 has its upper surface exposed.

The structure of the laminated polar plate 41 is not limited to this example. For example, as shown in FIG. 12B, a laminated polar plate 41a is formed such that a solid electrolyte layer 30 covers side and upper surfaces of an electrode active material layer 12 and a counter-electrode active material layer 22 covers side and upper surfaces of the solid electrolyte layer 30. Further, in the laminated polar plate 41a, the power-generating element 40 has formed therein an air gap 14 that divides the electrode active material layer 12 into an electrode active material layer 12a and an electrode active material layer 12b and that makes contact with the insulating layer 13. This reduces the occurrence of a short circuit due to contact between the electrode active material layer 12 and the counter-electrode active material layer 22 in the power-generating element laminating step, as the electrode active material layer 12 is covered with the solid electrolyte layer 30.

Further, for example, as shown in FIG. 12C, a laminated polar plate 41b is formed such that an electrode active material layer 12 is smaller in area than a solid electrolyte layer 30 in plan view and the solid electrolyte layer 30 is smaller in area than a counter-electrode active material layer 22 in plan view. Further, in a plan view, the counter-electrode active material layer 22 is located within the solid electrolyte layer 30, and the solid electrolyte layer 30 is located within the electrode active material layer 12. Further, in the laminated polar plate 41b, the power-generating element 40 has formed therein an air gap 14 that divides the electrode active material layer 12 into an electrode active material layer 12*a* and an electrode active material layer 12*b* and that makes contact with the insulating layer 13. Since the counter-electrode active material layer 22 is designed to be located within the solid electrolyte layer 30, the solid electrolyte layer 30 reduces the occurrence of a short-circuit due to contact between the electrode active material layer 12 and the counter-electrode active material layer 22 even if the counter-electrode active material layer 22 is laminated with a misalignment in plan view.

A laminated polar plate in the present embodiment may be a structure of any of the laminated polar plates 41, 41*a*, and 41*b*, or a structure other than the laminated polar structures 41, 41*a*, and 41*b* will do, provided such a structure is a structure in which a power-generating element 40 is laminated on top of a laminated combination of a collector 11 and a solid electrolyte layer 30 and the power-generating element 40 has formed therein an air gap, located between the collector 11 and the insulating layer 13, that makes contact with the insulating layer 13.

(3) Cutting Step and Collector Laminating Step

Figure 13:
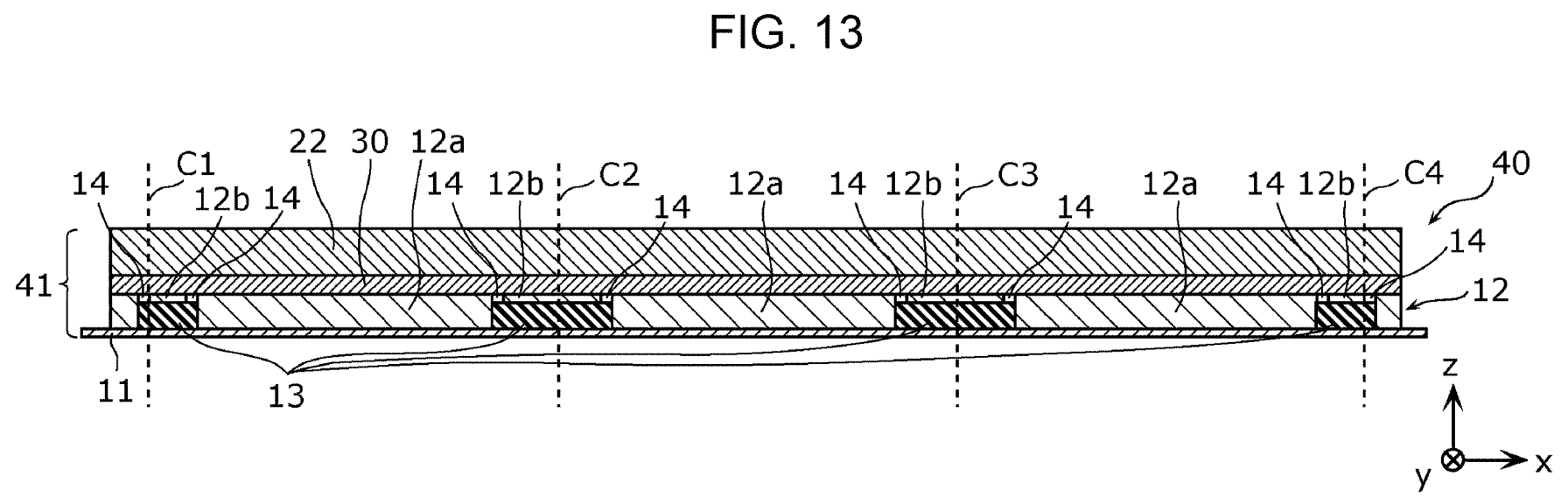

Next, the cutting step and the collector laminating step are described. FIG. 13 is a diagram for explaining the cutting step of the method for manufacturing a battery according to the present embodiment. In the cutting step, a laminated combination of the collector 11 and the power-generating element 40 laminated on the collector 11 in the power-generating element laminating step, i.e. the laminated polar plate 41, 41*a*, or 41*b*, is cut in the direction of laminating at a position where the insulating layer 13 is divided (step S18 of FIG. 9). As shown in FIG. 13, the laminated polar plate 41 is cut with a blade, laser light, or other devices at the positions of dashed lines C1, C2, C3, and C4 where the insulating layer 13 is disposed. At the positions of the dashed lines C1, C2, C3, and C4, the collector 11, the insulating layer 13, the electrode active material layer 12*b* of the electrode active material layer 12, the solid electrolyte layer 30, and the counter-electrode active material layer 22 are laminated in this order, and they are collectively cut. This makes it unnecessary to laminate the layers of the power-generating element 40 in shapes into which they have been cut, thus making it possible to easily manufacture batteries 50. For example, in a case where the insulating layer 13 is laminated in a grating shape or a striped shape in plan view, such as that show in FIG. 10A, 10B, or 10C, having an elongated portion, the laminated combination of the collector 11 and the power-generating element 40 is cut along a direction parallel with the length of the grating shape or the striped shape of the insulating layer 13. This gives batteries 50 each having an insulating layer 13 located at all ends facing cut surfaces of the battery 50 thus manufactured and having an air gap 14 in contact with the insulating layer 13.

Next, in the collector laminating step, after the laminated polar plate 41 has been cut in the cutting step, a collector 21 is laminated as an additional collector on a surface of the power-generating element 40 of the laminated polar plate 41 that faces away from the collector 11 (i.e. a surface of the power-generating element 40 perpendicular to the direction of laminating on which the collector 11 is not laminated) (step S19 of FIG. 9). Specifically, the collector 21 is bonded by a press process or other processes to the exposed upper surface of the counter-electrode active material layer 22 of the laminated polar plate 41 thus cut. The press process is performed at lower pressure than the high-pressure press process performed in step S17. This gives a battery 50 shown in FIGS. 1 and 2.

It should be noted that the cutting step and the collector laminating step may be transposed. That is, before the laminated polar plate 41 is cut in the cutting step, the collector 21 may be laminated first on the surface of the power-generating element 40 of the laminated polar plate 41 that faces away from the collector 11, and then a laminated combination of the laminated polar plate 41 and the collector 21 may be cut in the direction of laminating at the position where the insulating layer 13 is divided. Further, in the collector laminating step, a conductive substrate or housing may be laminated as an additional collector instead of the collector 21 on the surface of the power-generating element 40 that faces away from the collector 11.

Thus, the method for manufacturing a battery 50 includes the cutting step of cutting along a position where the collector 11, the insulating layer 13, the electrode active material layer 12*b* of the electrode active material layer 12, the solid electrolyte layer 30, and the counter-electrode active material layer 22 are laminated. This causes the respective side surfaces of the collector 11, the insulating layer 13, the electrode active material layer 12*b*, the solid electrolyte layer 30, the counter-electrode active material layer 22, and the collector 21 to be exposed at ends in directions perpendicular to the direction of laminating. It should be noted that the side surfaces exposed after cutting may be protected by a sealing member or other members that cover the side surfaces. That is, in a case where the side surfaces are covered with another member such as the sealing member, the side surfaces of all layers may not be exposed.

By thus including the cutting step of cutting along the position where the collector 11, the insulating layer 13, the electrode active material layer 12*b*, the solid electrolyte layer 30, and the counter-electrode active material layer 22 are laminated, ends of the collector 11, the insulating layer 13, the electrode active material layer 12*b*, the solid electrolyte layer 30, the counter-electrode active material layer 22, and the collector 21 in directions perpendicular to the direction of laminating are exposed.

(4) Effects

As noted above, the method for manufacturing a battery 50 according to the present embodiment includes an insulating layer laminating step, a power-generating element laminating step, a cutting step, and a collector laminating step. In the insulating layer laminating step, an insulating layer 13 is laminated on a portion of at least one surface of a collector 11. In the power-generating element laminating step, a power-generating element 40 obtained by laminating an electrode active material layer 12, a solid electrolyte layer 30, and a counter-electrode active material layer 22 in this order and a laminated combination of the collector 11 and the insulating layer 13 are laminated. Further, in the power-generating element laminating step, an air gap 14, located between the collector 11 and the solid electrolyte layer 30, that makes contact with the insulating layer 13 is formed inside the power-generating element 40. In the cutting step, a laminated combination of the collector 11 and the power-generating element 40 is cut in the direction of laminating at a position where the insulating layer 13 is divided. In the collector laminating step, before the power-generating element 40 is cut in the cutting step or after the power-generating element 40 has been cut in the cutting step, a collector 21 is laminated on a surface of the power-generating element 40 that faces away from the collector 11.

In this way, the laminated combination of the collector 11 and the power-generating element 40 is cut in the direction of laminating at the position where the insulating layer 13 is divided. This makes it unnecessary to laminate the layers of the power-generating element 40 in shapes into which they have been cut, thus making it possible to easily manufacture the battery 50.

Further, since the laminated combination of the collector 11 and the power-generating element 40 is cut in the direction of laminating at the position where the insulating layer 13 is divided, the battery is manufactured with the insulating layer 13 laminated at ends of the collector 11 in plan view. Furthermore, the collector 11, the insulating layer 13, and the electrode active material layer 12b are laminated in this order at the ends of the collector 11 of the battery 50 thus manufactured in plan view. Therefore, even if the collector 11 delaminates at the ends of the collector 11, at which delamination tends to occur, it becomes hard for damage, a short circuit, or other failures to occur due to contact with another member, as the insulating layer 13 is exposed and the electrode active material layer 12b, which is in contact with the upper surface of the insulating layer 13, does not function as a battery, either. This makes it possible to manufacture a highly-reliable battery.

Further, the dimensions of the insulating layer 13 and the electrode active material layer 12b can be determined simply by adjusting cutting position. Therefore, the presence of the air gap 14 formed in contact with the insulating layer 13 blocks the electrode active material layer 12b and the collector 11 from giving and receiving electrons to and from each other, inhibiting the electrode active material layer 12b from functioning as an electrode. However, the region can be minimized by adjusting the dimensions of the insulating layer 13 and the electrode active material layer 12b. This makes it possible to easily manufacture a battery 50 with a high volume energy density.

Further, in a case where the electrode active material layer 12 is a positive-electrode active material layer and the counter-electrode active material layer 22 is a negative-electrode active material layer, the division of the ends of the positive-electrode active material layer (electrode active material layer 12) by the air gap 14 inhibits the ends of the positive-electrode active material layer (electrode active material layer 12b) from functioning as electrodes, as electrons from the collector 11 do not reach the ends of the positive-electrode active material layer (electrode active material layer 12b). That is, the substantive area of the positive-electrode active material layer is reduced. This causes the positive-electrode active material layer to become narrower in substantive area (area that functions as an electrode) than the negative-electrode active material layer and be located within the negative-electrode active material layer in plan view. This results in suppression of deposition of metal on the negative-electrode active material layer as mentioned above. This brings about further improvement in reliability of the battery 50 to be manufactured.

Further, by being cut in the direction of laminating, the laminated combination of the collector 11 and the power-generating element 40 (e.g. the laminated polar plate 41, 41a, or 41b) is cut to give a battery with the air gap 14 formed in contact with the insulating layer 13 at the ends of the power-generating element 40. This makes it unnecessary to separately laminate the positive-electrode active material layer and the negative-electrode active material layer for each single cell with the positive-electrode active material layer and the negative-electrode active material layer shaped with a difference in area, thus making it possible to easily manufacture batteries 50 with high production efficiency.

In the absence of the insulating layer 13 and the air gap 14, the solid electrolyte layer 30 is laminated at the ends of an undivided electrode active material layer 12 too. Therefore, even when the laminated combination of the collector 11 and the power-generating element 40 is cut, a battery is manufactured in which exposure of the electrode active material layer 12, which functions as a battery, cannot be reduced when the ends of the collector 11 delaminate and in which there is no substantive difference in area between the electrode active material layer 12 and the counter-electrode active material layer 22. Therefore, although a battery can be easily manufactured, such a battery is low in reliability, and it is hard to employ such a manufacturing method. On the other hand, in the manufacturing method according to the present embodiment, as mentioned above, the laminated combination of the collector 11 and the power-generating element 40 is cut at the position where the insulating layer 13 is divided. Therefore, cutting the laminated combination of the collector 11 and the power-generating element 40 makes it possible to, in addition to easily manufacturing a battery, reduce the area of the electrode active material layer 12 that functions as an electrode and adjust the areas of the insulating layer 13 and the electrode active material layer 12b. Further, the formation of the air gap 14 relaxes the stress attributed to the expansion and contraction of the electrode active material layer 12, reducing the likelihood of interlayer delamination between the electrode active material layer 12 and anther constituent element. Such a combination of a collector laminating step of laminating an insulating layer 13 on a collector 11, a power-generating element laminating step of laminating a power-generating element 40 having formed therein an air gap 14 that makes contact with the insulating layer 13, and a cutting step of cutting a laminated combination of the collector 11 and the power-generating element 40 at a position where the insulating layer 13 is divided makes it possible to easily manufacture a highly-reliable battery with a high volume energy density.

(5) Other Manufacturing Methods

The method for manufacturing a battery according to the present embodiment is not limited to the aforementioned example but may for example be the following manufacturing method.

First, a collector 11 having a shape shown in FIGS. 1 and 2 is prepared. Then, an application process or other processes are used to laminate an insulating layer 13 on top of the collector 11 in a shape shown in FIGS. 1 and 2. An electrode active material layer 12 is laminated by coating all over a laminated combination of the collector 11 and the insulating layer 13, whereby an electrode plate having an air gap 14 is obtained by a method that is similar to that described in the formation of the air gap 14 in the aforementioned steps S13 and S14.

Next, a collector 21 having a shape shown in FIGS. 1 and 2 is prepared. Then, a counter-electrode active material layer 22 and a solid electrolyte layer 30 are laminated by layered coating in this order on top of each other all over the collector 21, whereby a counter-electrode plate is obtained.

Next, the electrode plate thus obtained and the counter-electrode plate thus obtained are laminated such that the electrode active material layer 12 of the electrode plate and the solid electrolyte layer 30 of the counter-electrode plate are in contact with each other. The laminated body thus laminated is pressed from both sides in the direction of laminating by using a flat-plate press, whereby a battery 50 is obtained.

Embodiment 2

The following describes Embodiment 2. The following describes Embodiment 2 with a focus on differences from Example 1 described above, and omits or simplifies a description of common features.

Figure 14:
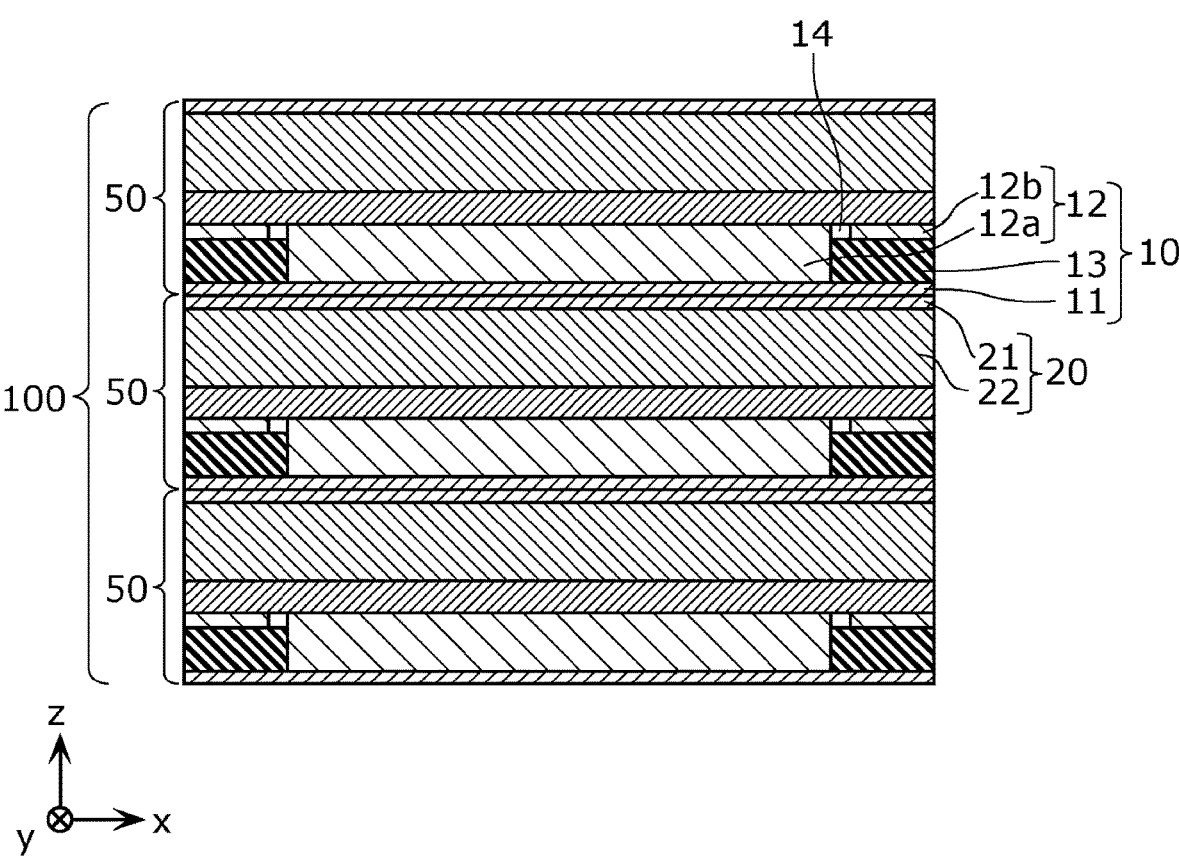
FIG. 14 is a schematic cross-sectional view showing an example of a battery according to Embodiment 2.

FIG. 14 is a schematic cross-sectional view schematically showing an example of a battery according to the present embodiment. As shown in FIG. 14, the battery 100 includes a plurality of the batteries 50 according to Embodiment 1, and has a structure in which the plurality of batteries 50 are laminated. The plurality of batteries 50 are laminated such that the electrode layer 10 of a first one of batteries 50 adjacent to each other in the direction of laminating and the counter-electrode layer 20 of a second one of the adjacent batteries 50 face each other. That is, the battery 100 is a series-laminated battery. This makes it possible to achieve a high-voltage battery 100 through the use of batteries 50 according to Embodiment 1.

A side surface of the battery 100 is a flat surface, and in other words, the respective side surfaces of the plurality of batteries 50 are flush with one another. For the purpose of connecting leads or other wires, the plurality of batteries 50 may be laminated out of alignment in a direction perpendicular to the direction of laminating.

The battery 100 is manufactured, for example, by laminating the plurality of batteries 50 such that the electrode layer 10 of a first one of batteries 50 adjacent to each other in the direction of laminating and the counter-electrode layer 20 of a second one of the adjacent batteries 50 face each other. Alternatively, the battery 100 may be manufactured by, before cutting a laminated polar plate 41 (see FIG. 12A), laminating a collector 21 on a side of the power-generating element 40 that faces away from the collector 11, laminating a plurality of laminated combinations of the laminated polar plate 41 and the collector 21, and then cutting the laminated combinations in the direction of laminating at a position where the insulating layers 13 are divided.

Although the batteries 50 are laminated to give a structure in which two collectors 11 and 21 are adjacent to each other, a battery may be free from either of the adjacent collectors 11 and 21.

Although the battery 100 is a series-laminated battery, it may be a parallel-laminated battery having a structure in which the electrode layers 10 or counter-electrode layers 20 of adjacent batteries 50 face each other. A parallel-laminated battery can achieve a high-capacity battery.

Thus, laminating the batteries 50, which are single cells, makes it possible to achieve a high-capacity or high-voltage battery that can exhibit an effect similar to that of the batteries 50.

OTHER EMBODIMENTS

In the foregoing, a battery according to the present disclosure and a method for manufacturing the same have been described with reference to embodiments; however, the present disclosure is not intended to be limited to these embodiments. Applications to the present embodiments of various types of modification conceived of by persons skilled in the art and other embodiments constructed by combining some constituent elements of the embodiments are encompassed in the scope of the present disclosure, provided such applications and embodiments do not depart from the spirit of the present disclosure.

Although, in each of the foregoing embodiments, the battery 50 is constituted by a collector 11, an insulating layer 13, an electrode active material layer 12, a solid electrolyte layer 30, a counter-electrode active material layer 22, and a collector 21, this is not intended to impose any limitation. For example, a bonding layer or other layers for reducing electric resistance and improving bonding strength may be provided between each of the layers of the battery and another.

Further, although, in each of the foregoing embodiments, the air gap 14 is in contact with the insulating layer 13 and the solid electrolyte layer 30, this is not intended to impose any limitation. The air gap may be in contact with the insulating layer 13 and may not be in contact with the solid electrolyte layer 30.

Further, in addition to the components of the battery 50 according to any of the foregoing embodiments, the battery 50 may include a second insulating layer located between the collector 21 and the counter-electrode active material layer 22 at ends of the counter-electrode layer 20 and a second air gap, located between the second insulating layer and the solid electrolyte layer 30, that is in contact with the second insulating layer. In this case, the length of the second insulating layer from the outer periphery of the collector 21 in plan view may be less than the length of the insulating layer 13 from the outer periphery of the collector 11.

Further, although, in each of the foregoing embodiments, the insulating layer 13 and the air gap 14 are in the shape of a frame located on the outer periphery of the electrode layer 10 in plan view, this is not intended to impose any limitation. For example, in the battery 50, there may be a region on the outer periphery of the electrode layer 10 where the insulating layer 13 and/or the air gap 14 is/are not provided.

Further, for example, in each of the foregoing embodiments, the battery 50 may not include a collector 21 on the counter-electrode active material layer 22 in a case where the battery 50 is surrounded by a housing or substrate and a portion of the housing or substrate functions as a collector. In other words, the counter-electrode layer 20 may be constituted by the counter-electrode active material layer 22.

Further, the foregoing embodiments are subject, for example, to various changes, substitutions, additions, and omissions in the scope of the claims or the scope of equivalents thereof.

A battery according to the present disclosure may be used as a secondary battery such as an all-solid battery for use, for example, in various types of electronics, automobiles, or other devices.

What is claimed is:

1. A battery comprising:

an electrode layer;

a counter-electrode layer placed opposite to the electrode layer; and a solid electrolyte layer located between the electrode layer and the counter-electrode layer, wherein the electrode layer, the counter-electrode layer, and the solid electrolyte layer are laminated in a z direction, and wherein the electrode layer includes the following components:

a collector, an electrode active material layer located between the collector and the solid electrolyte layer, and an insulating layer located between the collector and the solid electrolyte layer and bonded to the collector at ends of the electrode layer, the electrode active material layer has a region that does not overlap the insulating layer in plan view, and the electrode active material layer has a region that overlaps the insulating layer in plan view, wherein the region that overlaps the insulating layer in plan view does not contribute to the charge-discharge performance of the battery, the battery has an air gap, the air gap being located between the insulating layer and the solid electrolyte layer in the z direction such that a first side of the air gap is in contact with the insulating layer and a second side of the air gap, which is directly opposite to the first side of the air gap, is in contact with the solid electrolyte layer, and a side surface of the collector, a side surface of the insulating layer, a side surface of the region that overlaps the insulating layer in plan view, a side surface of the solid electrolyte layer, and a side surface of the counter-electrode layer, each located at an end of the battery in a direction perpendicular to the z direction are flush with one another to form a same flat surface.

2. The battery according to claim 1, wherein the electrode layer is a positive-electrode layer, and the counter-electrode layer is a negative-electrode layer.

3. The battery according to claim 1, wherein the air gap is contact with the solid electrolyte layer.

4. The battery according to claim 3, wherein the air gap overlaps an inner end of a bonded surface between the insulating layer and the collector in plan view.

5. The battery according to claim 1, wherein the insulating layer contains resin.

6. The battery according to claim 1, wherein the insulating layer contains an inorganic filler.

7. The battery according to claim 1, wherein the insulating layer is higher in coefficient of linear expansion than the electrode active material layer.

8. The battery according to claim 1, wherein an inner side surface of the insulating layer is in direct contact with the region of the electrode active material layer that does not overlap the insulating layer in plan view, the inner side surface of the insulating layer is located no more than 1 mm from an outer side surface of the insulating layer, and the outer side surface of the insulating layer is flush with an outer side surface of the collector.

9. The battery according to claim 1, wherein a thickness of the insulating layer is greater than or equal to 50% and less than or equal to 100% of a thickness of the electrode active material layer.

10. The battery according to claim 1, wherein a side surface of the battery is a cut surface.

11. The battery according to claim 1, wherein the insulating layer is in a shape of a frame provided on an outer periphery of the electrode layer in plan view.

12. The battery according to claim 1, wherein the solid electrolyte layer contains a solid electrolyte having lithium-ion conductivity.

* * * * *